(12) United States Patent
Goh et al.

(10) Patent No.: US 12,176,484 B2
(45) Date of Patent: Dec. 24, 2024

(54) ORGANIC ELECTROLYTE, AND SECONDARY BATTERY COMPRISING SAME

(71) Applicant: Samsung SDI Co., Ltd., Yongin-si (KR)

(72) Inventors: Aehui Goh, Yongin-si (KR); Taehyon Bae, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 673 days.

(21) Appl. No.: 17/310,363

(22) PCT Filed: Dec. 10, 2019

(86) PCT No.: PCT/KR2019/017384
§ 371 (c)(1),
(2) Date: Jul. 29, 2021

(87) PCT Pub. No.: WO2020/162659
PCT Pub. Date: Aug. 13, 2020

(65) Prior Publication Data
US 2022/0093970 A1    Mar. 24, 2022

(30) Foreign Application Priority Data
Feb. 7, 2019 (KR) .................. 10-2019-0014439

(51) Int. Cl.
*H01M 10/00*   (2006.01)
*H01M 10/0525*  (2010.01)
*H01M 10/0565*  (2010.01)

(52) U.S. Cl.
CPC ... *H01M 10/0565* (2013.01); *H01M 10/0525* (2013.01); *H01M 2300/0082* (2013.01)

(58) Field of Classification Search
CPC .................... H01M 10/0565; H01M 10/0525
See application file for complete search history.

(56) References Cited

U.S. PATENT DOCUMENTS

| | | | |
|---|---|---|---|
| 9,819,057 B2 | 11/2017 | Suh et al. | |
| 10,541,445 B2 | 1/2020 | Yu et al. | |
| 2006/0035144 A1 | 2/2006 | Shimizu et al. | |
| 2006/0194118 A1* | 8/2006 | Yew | H01M 10/0567 429/200 |

(Continued)

FOREIGN PATENT DOCUMENTS

| CN | 1866605 B | 4/2011 |
|---|---|---|
| CN | 105826607 A | 8/2016 |

(Continued)

OTHER PUBLICATIONS

International Search Report for corresponding Application No. PCT/KR2019/017384 dated Mar. 26, 2020, 5 pp.

(Continued)

*Primary Examiner* — Cynthia H Kelly
*Assistant Examiner* — Monique M Wills
(74) *Attorney, Agent, or Firm* — Lewis Roca Rothgerber Christie LLP

(57) ABSTRACT

The present invention relates to an organic electrolyte including at least one cyclic nitrile-based compound; and at least one chain type nitrile-based compound, and a secondary battery including the same.

16 Claims, 17 Drawing Sheets

(56) References Cited

U.S. PATENT DOCUMENTS

| | | | | |
|---|---|---|---|---|
| 2008/0131785 | A1* | 6/2008 | Park | H01M 10/052 |
| | | | | 429/339 |
| 2017/0346136 | A1* | 11/2017 | Wang | H01M 10/0525 |
| 2018/0183100 | A1 | 6/2018 | Jeong et al. | |

FOREIGN PATENT DOCUMENTS

| | | |
|---|---|---|
| CN | 106099185 A | 11/2016 |
| CN | 107417569 A | 12/2017 |
| JP | 2010-073367 A | 4/2010 |
| JP | 2013-038029 A | 2/2013 |
| KR | 10-2008-0035227 A | 4/2008 |
| KR | 10-2014-0032918 A | 3/2014 |
| KR | 10-2014-0067244 A | 6/2014 |
| KR | 10-2015-0130910 A | 11/2015 |
| KR | 10-2016-0006096 A | 1/2016 |
| KR | 10-2016-0150604 A | 12/2016 |
| KR | 10-2017-0051286 A | 5/2017 |
| KR | 10-2017-0060829 A | 6/2017 |
| KR | 10-2018-0050780 A | 5/2018 |

OTHER PUBLICATIONS

Korean Notice of Allowance for KR 10-2019-0014439 dated Jul. 18, 2022, 2 pages.

Chinese Office Action, with English translation, dated Nov. 15, 2023, issued in corresponding Chinese Patent Application No. 201980091347.2 (35 pages).

Office action dated Jul. 30, 2024 issued in corresponding CN Patent Application No. 201980091347.2, 9pp.

* cited by examiner

ORGANIC ELECTROLYTE, AND SECONDARY BATTERY COMPRISING SAME

CROSS-REFERENCE TO RELATED APPLICATIONS

This application is a U.S. National Phase Patent Application of International Application Number PCT/KR2019/017384, filed on Dec. 10, 2019, which claims priority to Korean Patent Application Number 10-2019-0014439, filed on Feb. 7, 2019, the entire content of both of which is incorporated herein by reference.

TECHNICAL FIELD

The present invention relates to an organic electrolyte, and a secondary battery including the same.

BACKGROUND ART

Lithium batteries are used as actuating power sources for portable electronic devices including camcorders, mobile phones, and laptop computers. Lithium secondary batteries are rechargeable at high rates and have a high energy density per unit weight of about three times higher than that of conventional lead storage batteries, nickel-cadmium batteries, nickel-hydrogen batteries, and nickel-zinc batteries.

Lithium batteries operate at a high driving voltage, and thus aqueous electrolytes highly reactive to lithium could not be used. For lithium batteries, non-aqueous electrolytes, for example, organic electrolytes are normally used. The organic electrolytes are prepared by dissolving lithium salts in organic solvents. Appropriate organic solvents for the organic electrolytes may be stable at high voltage, and have a high ionic conductivity, a high dielectric constant, and a low viscosity.

Meanwhile, lithium secondary batteries have high-capacity and high-voltage and thus swelling caused by decomposition of organic electrolytes brings with it growing significance of stability. In addition, organic electrolytes are made of organic materials, which means the organic electrolytes are easily decomposed at high temperature and high voltage, and thus adversely affect battery performance. Accordingly, there have been studies to overcome the limitation.

In particular, there is a continuous demand for the development of organic electrolytes suitable for manufacturing a lithium secondary battery exhibiting excellent capacity retention rate in a high voltage setting and having excellent storage characteristics at high temperature.

DESCRIPTION OF EMBODIMENTS

Technical Problem

One aspect provides an organic electrolyte of a novel composition.

Another aspect provides a secondary battery including the organic electrolyte.

Solution to Problem

One aspect provides an organic electrolyte of a novel composition.

Another aspect provides a secondary battery including the organic electrolyte.

Advantageous Effects of Disclosure

An organic electrolyte according to an aspect includes at least one cyclic nitrile-based compound and at least one chain type nitrile-based compound, thereby improving high temperature lifespan characteristics and high temperature storage characteristics of secondary batteries.

Numbers for main components of drawings

Figure 1:
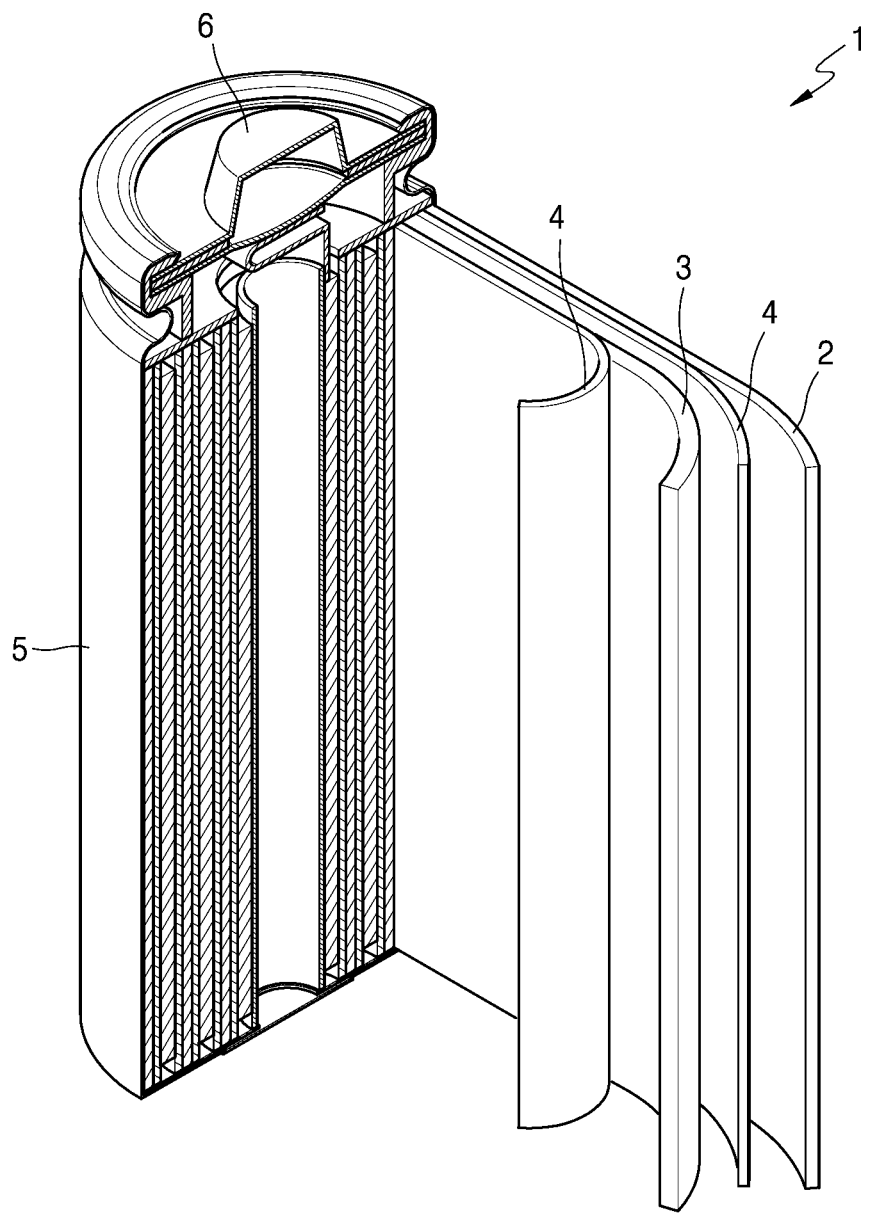
FIG. 1 is a schematic diagram showing a structure of a lithium secondary battery according to an embodiment.

| | |
|---|---|
| 1: Lithium battery | 2: Negative Electrode |
| 3: Positive electrode | 4: Separator |
| 5: Battery case | 6: Cap assembly |

MODE OF DISCLOSURE

The present inventive concept described below may be modified in various forms and have many embodiments, and particular embodiments are illustrated in the drawings and described in detail in the detailed description. However, the present inventive concept should not be construed as limited to the particular embodiments, but should be understood to cover all modifications, equivalents or replacements included in the technical scope of the present inventive concept.

The terminology used herein is for the purpose of explaining particular embodiments only and is not intended to limit the present inventive concept. The singular forms include the plural forms as well, unless the context clearly indicates otherwise. It will be further understood that the terms "comprise" or "comprising" when used herein, specify the presence of stated features, numbers, steps, operations, elements, parts, components, materials, or combinations thereof, but do not preclude the presence or addition of one or more other features, numbers, steps, operations, elements, parts, components, materials, or combinations thereof. "/"

used hereinafter may be interpreted as "and" or interpreted as "or" according to circumstances.

In the drawings, the diameter, length, and thicknesses of elements, layers and regions are enlarged or reduced for clear explanation. The same reference numerals are designated for similar elements throughout. When a layer, film, region, plate, or the like is referred to as being "on" another part, it can be directly on the other part, or intervening parts may be present. The terms "first", "second", and the like may be used for describing various elements throughout, but the elements are not limited by the terms. The terms are used to only distinguish one element from other elements. Some of elements may be omitted in the drawings, but this is for aiding understanding of the features of the present invention, and is not intended to exclude the omitted elements.

Hereinafter, an organic electrolyte according to example embodiments and a secondary battery including the same will be described in detail.

An organic electrolyte according to an embodiment includes at least one cyclic nitrile-based compound represented by Formula 1 below; and at least one chain type nitrile-based compound:

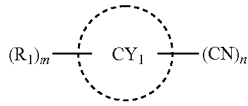

Formula 1 wherein in Formula 1 above, $CY_1$ is a $C_5$-$C_{20}$ carbocyclic group, $R_1$ is selected from hydrogen, deuterium, —F, —Cl, —Br, —I, a hydroxyl group, a nitro group, an amino group, an amidino group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, and a substituted or unsubstituted $C_3$-$C_{10}$ cycloalkyl group, m is an integer selected from 0 to 39, and when m is 2 or more, 2 or more $R_1$ is are the same as or different from each other, n is an integer selected from 1 to 40;

$6 \leq m+n \leq 40$.

Chain type nitrile-based compounds form an SEI film having good reversibility on a surface of a positive electrode, but this SEI film is not stable enough at high temperature, and thus, there has been a demand for improving high temperature lifespan characteristics and high temperature storage characteristics of secondary batteries using organic electrolytes containing the linear nitrile-based compounds.

Accordingly, the present inventor surprisingly found out that, when a cyclic nitrile-based compound is added to a chain type nitrile-based compound, the high temperature lifespan characteristics and the high temperature storage characteristics of secondary batteries are enhanced, and in this regard, the present invention has been accomplished.

In a secondary battery including an organic electrolyte containing the cyclic nitrile-based compound represented by Formula 1 above, the cyclic nitrile-based compound forms a passivation film (solid electrolyte interface (SEI) film) on a surface of a positive electrode, and this SEI film is stable at high temperature, and may thus prevent deterioration of an active material. As a result, high temperature lifespan characteristics and high temperature storage characteristics of the secondary battery are enhanced. Without wishing to be bound by theory, the cyclic nitrile-based compound basically has a higher boiling point than the chain type nitrile-based compound, and a nitrile group present in the cyclic nitrile-based compound is firmly bonded to a ring through a sigma bond, and forms an SEI film through polymerization by lone pair electrons of the nitrile group, and thus, it is assumed that a stable SEI film may be formed even at high temperature.

The cyclic nitrile-based compound forms a stable SEI film, which may serve as a resistive layer for Li ions, but when the cyclic nitrile-based compound is combined with the chain type nitrile-based compound, an SEI film having improved reversibility as well as being stable at high temperature is obtainable. Accordingly, it may be possible to develop an electrolyte that forms a stable SEI film at high temperature and minimizes an increase in resistance by using an appropriate combination of amounts of the cyclic nitrile-based compound and the chain type nitrile-based compound. This, in high temperature long-term lifespan evaluation, prevents decomposition of the positive electrode and minimizes collapse of a positive electrode structure, leading to improved capacity and charging/discharging efficiency characteristics, and in high temperature storage evaluation, reduces gas generation, leading to improved swelling characteristics.

According to an embodiment, in Formula 1 above, $CY_1$ may be a $C_5$-$C_{20}$ aliphatic cyclic group, and may be $10 \leq m+n \leq 40$.

In Formula 1 above, $CY_1$ may be selected from a cyclopentane group, a cyclohexane group, a cycloheptane group, a cyclooctane group, a cyclononane group, a cyclodecane group, a cycloundecane group, a cyclododecane group, a cyclotridecane group, a cyclotetradecane group, a cyclopentadecane group, a cyclohexadecane group, a cycloheptadecane group, a cyclooctadecane group, a cyclononadecane group, and a cycloicosane group.

For example, in Formula 1 above, $CY_1$ may be selected from a cyclopentane group, a cyclohexane group, a cycloheptane group, a cyclooctane group, a cyclononane group, and a cyclodecane group, but is not limited thereto, and $CY_1$ may include both single rings and condensed rings, which are formed of carbons.

For example, in Formula 1 above, $CY_1$ may be a cyclopentane group, a cyclohexane group, or a cycloheptane group. For example, in Formula 1 above, $CY_1$ may be a cyclohexane group.

$R_1$ may be selected from:

hydrogen, deuterium, —F, —Cl, —Br, —I, a hydroxyl group, a nitro group, an amino group, an amidino group, a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-pentyl group, a 3-pentyl group, and a sec-isopentyl group; and a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-a pentyl group, a 3-pentyl group, and a sec-isopentyl group, each substituted with at least one of deuterium, —F, —Cl, —Br, —I, a hydroxyl group, a nitro group, an amino group, and an amidino group.

For example, $R_1$ may be selected from: hydrogen, deuterium, —F, —Cl, —Br, —I, a hydroxyl group, a nitro group, an amino group, an amidino group, a methyl group, an ethyl group, a propyl group, an iso-propyl group, an n-butyl group, an iso-butyl group, a sec-butyl group, a tert-butyl group; and a methyl group, an ethyl group, a propyl group, an iso-propyl group, an n-butyl group, an iso-butyl group, a sec-butyl group, a tert-butyl group, each substituted with at least one of deuterium, —F, —Cl, —Br, —I, a hydroxyl group, a nitro group, an amino group, and an amidino group.

For example, $R_1$ may be selected from hydrogen, a methyl group, an ethyl group, a propyl group, an iso-propyl group, an n-butyl group, an iso-butyl group, a sec-butyl group, and a tert-butyl group.

For example, $R_1$ may be hydrogen.

An organic electrolyte where Formula 1 above is represented by any one selected from Formulas 1-1 to 1-36:

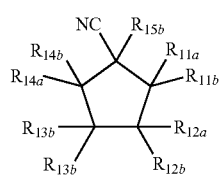

1-1

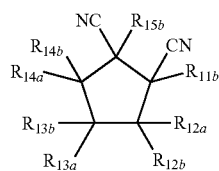

1-2

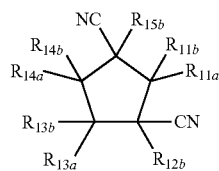

1-3

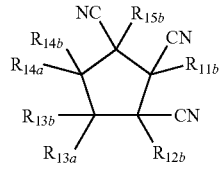

1-4

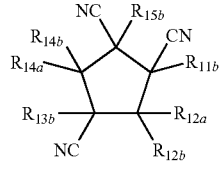

1-5

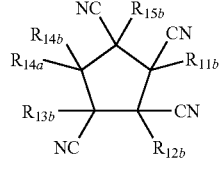

1-6

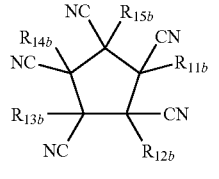

1-7

-continued

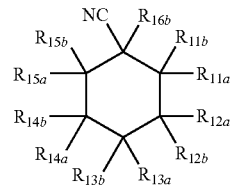

1-8

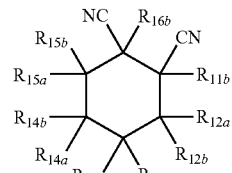

1-9

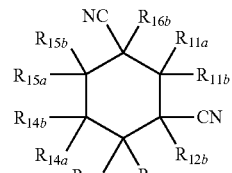

1-10

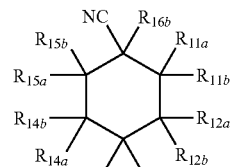

1-11

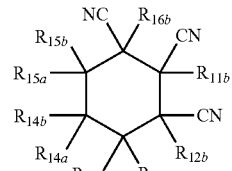

1-12

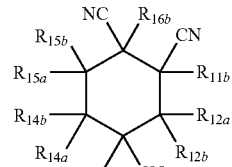

1-13

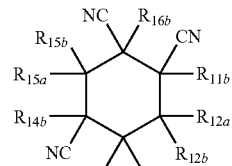

1-14

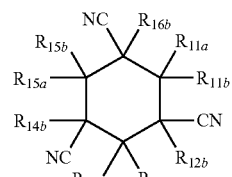

1-15

-continued
1-16
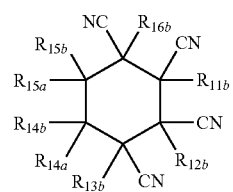
1-17
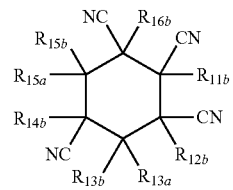
1-18
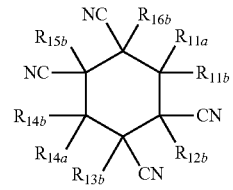
1-19
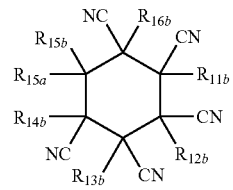
1-20
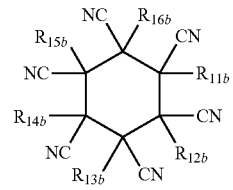
1-21
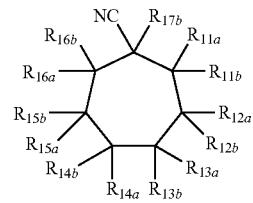
1-22
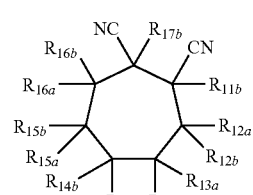
1-23
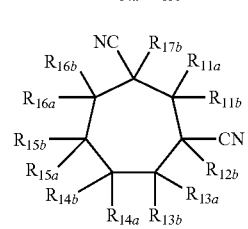
-continued
1-24
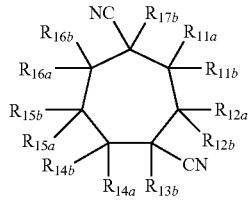
1-25
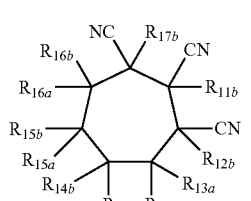
1-26
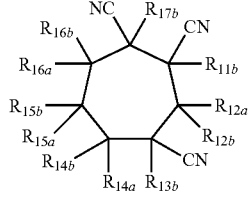
1-27
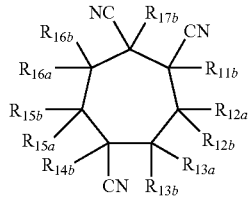
1-28
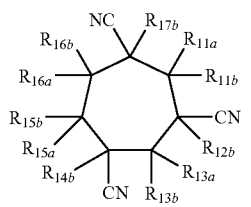
1-29
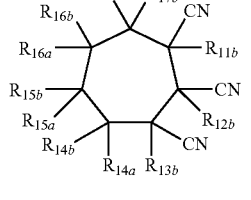
1-30
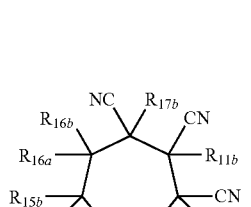

-continued

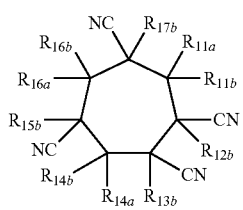

1-31

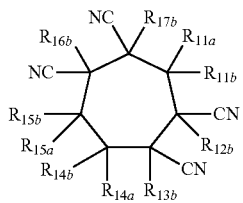

1-32

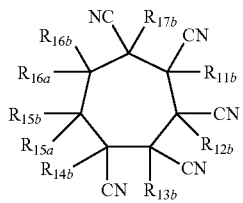

1-33

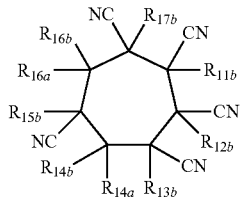

1-34

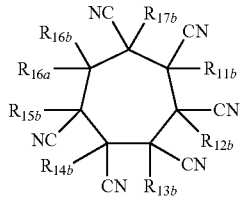

1-35

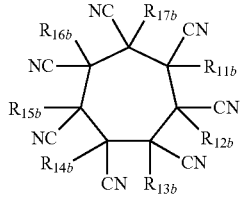

1-36

In Formulas 1-1 to 1-36 above, $R_{11a}$ to $R_{17a}$, and $R_{11b}$ to $R_{17b}$ respectively refer to the description of $R_1$ described above.

For example, in Formulas 1-1 to 1-36 above, $R_{11a}$ to $R_{17a}$, and $R_{11b}$ to $R_{17b}$ may be each independently selected from:

hydrogen, deuterium, —F, —Cl, —Br, —I, a hydroxyl group, a nitro group, an amino group, an amidino group, a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-pentyl group, a 3-pentyl group, and a sec-isopentyl group; and a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-a pentyl group, a 3-pentyl group, and a sec-isopentyl group, each substituted with at least one of deuterium, —F, —Cl, —Br, —I, a hydroxyl group, a nitro group, an amino group, and an amidino group.

For example, $R_{11a}$ to $R_{17a}$, and $R_{11b}$ to $R_{17b}$ may be each independently selected from: hydrogen, deuterium, —F, —Cl, —Br, —I, a hydroxyl group, a nitro group, an amino group, an amidino group, a methyl group, an ethyl group, a propyl group, an iso-propyl group, an n-butyl group, an iso-butyl group, a sec-butyl group, a tert-butyl group; and a methyl group, an ethyl group, a propyl group, an iso-propyl group, an n-butyl group, an iso-butyl group, a sec-butyl group, a tert-butyl group, each substituted with at least one of deuterium, —F, —Cl, —Br, —I, a hydroxyl group, a nitro group, an amino group, and an amidino group.

For example, $R_{11a}$ to $R_{17a}$, and $R_{11b}$ to $R_{17b}$ may be each independently selected from hydrogen, a methyl group, an ethyl group, a propyl group, an iso-propyl group, an n-butyl group, an iso-butyl group, a sec-butyl group, and a tert-butyl group.

For example, $R_{11a}$ to $R_{17a}$, and $R_{11b}$ to $R_{17b}$ each may be hydrogen.

The cyclic nitrile-based compound may be contained in an amount of 1 wt % to 2 wt % with respect to a total weight of the organic electrolyte.

For example, the cyclic nitrile-based compound may be contained in an amount of 1 wt % with respect to a total weight of the organic electrolyte. For example, the cyclic nitrile-based compound may be contained in an amount of 2 wt % with respect to a total weight of the organic electrolyte.

When the amount of the cyclic nitrile-based compound satisfies the above range, a stable SEI film is formed on an electrode surface, thereby improving high temperature lifespan and high temperature storage characteristics of secondary batteries.

The chain type nitrile-based compound may be represented by Formula 2 below.

$$X_1—R—X_2 \qquad \text{Formula 2}$$

In Formula 2 above,

R is selected from a substituted or unsubstituted $C_1$-$C_{20}$ alkylene group, $X_1$ and $X_2$ are each independently selected from hydrogen, deuterium, —F, —Cl, —Br, —I, a hydroxyl group, a cyano group, a nitro group, an amidino group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, and a substituted or unsubstituted $C_3$-$C_{10}$ cycloalkyl group, and at least one of $X_1$ and $X_2$ is a cyano group.

An organic electrolyte where in Formula 2 above, R is selected from Formulas 2-1 to 2-5 below:

2-1

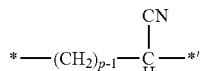

2-2

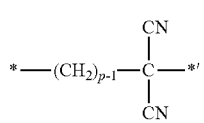

2-3

-continued

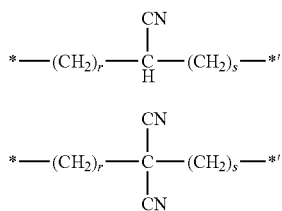

2-4

*—(CH$_2$)$_r$—C(CN)(H)—(CH$_2$)$_s$—*'

2-5

*—(CH$_2$)$_r$—C(CN)(CN)—(CH$_2$)$_s$—*'

In Formulas 2-1 to 2-5 above,
p is each independently an integer selected from 1 to 20,
r and s are each independently an integer selected from 1 to 10,
2≤r+s≤19, and
* and *' are binding sites with X$_1$ and X$_2$, respectively in Formula 2.

In Formula 2 above, both X$_1$ and X$_2$ are cyano groups.

The chain type nitrile-based compound may include a chain type nitrile-based compound containing two cyano groups and a chain type nitrile-based compound containing three cyano groups.

The chain type nitrile-based compound containing two cyano groups may include at least one compound selected from malononitrile, succinonitrile, glutaronitrile, adiponitrile, pimelonitrile, suberonitrile, azelanitrile, sebaconitrile, and undecane dinitrile, but is not limited thereto.

The chain type nitrile-based compound containing three cyano groups may include at least one compound selected from 1,2,3-hexanetricarbonitrile, 1,2,4-hexanetricarbonitrile, 1,2,5-hexanetricarbonitrile, 1,2,6-hexanetricarbonitrile, 1,3,4-hexanetricarbonitrile, 1,3,5-hexanetricarbonitrile, 1,3,6-hexanetricarbonitrile, and 1,4,5-hexanetricarbonitrile, but is not limited thereto.

The chain type nitrile-based compound may be contained in an amount of 3 wt % to 7 wt % with respect to a total weight of the organic electrolyte. For example, the chain type nitrile-based compound may be contained in an amount of 3 wt % to 6 wt %, 3 wt % to 5 wt %, 4 wt % to 7 wt %, or 5 wt % to 7 wt %, with respect to a total weight of the organic electrolyte.

When the amount of the chain type nitrile-based compound satisfies the above range, reversibility of the SEI film formed on the electrode interface may be enhanced, thereby improving charging/discharging characteristics and battery performance of secondary batteries.

The chain type nitrile-based compound containing two cyano groups and the chain type nitrile-based compound containing three cyano groups may have a weight ratio of 3:2.

The organic electrolyte further includes a lithium salt. The concentration of the lithium salt in the organic electrolyte may be about 0.01 M to 2.0 M, but is not necessarily limited to this range, and the lithium salt may be used in an appropriate concentration within a range that does not deteriorate battery performance. Further improved battery characteristics may be obtained within the above concentration range.

The lithium salt used in the organic electrolyte is not particularly limited, and any lithium salt which may be used as a lithium salt in the art is allowed. For example, the lithium salt may include at least one selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$)(2≤x≤20, 2≤y≤20), LiCl, LiI, lithium bis (oxalato) borate (LiBOB), and LiPO$_2$F$_2$.

The organic electrolyte may include an organic solvent. The organic solvent may include at least one selected from the group consisting of dialkylcarbonate, a cyclic carbonate, a linear or cyclic ether, a linear or cyclic amide, an aliphatic nitrile, a linear or cyclic ether, and a derivative thereof.

To be specific, the organic solvent may include at least one selected from the group consisting of ethylmethylcarbonate (EMC), methylpropylcarbonate, ethylpropylcarbonate, dimethylcarbonate (DMC), diethylcarbonate (DEC), dipropylcarbonate, propylenecarbonate (PC), ethylenecarbonate (EC), fluoroethylenecarbonate (FEC), vinylene carbonate (VC), vinylethylene carbonate (VEC), butylene carbonate, ethylpropionate (EP), propylpropionate (PP), ethylbutyrate, dimethylsulfoxide, dimethylformamide, dimethylacetamide, γ-valerolactone, γ-butyrolactone, and tetrahydrofuran, but is not limited thereto, and any organic solvent which may be used for an organic electrolyte in the art is allowed.

In some cases, for the purpose of improving lifespan characteristics of batteries, preventing battery capacity reduction, and improving discharge capacity of batteries, the organic electrolyte may include at least one among propane sulfone (PS), vinylene carbonate (VC), or vinylene ethylene carbonate (VEC), but is not limited thereto, and any material which may be added to the organic electrolyte in the art may be allowed.

The organic electrolyte may be liquid or gel. The organic electrolyte may be prepared by adding a lithium salt, a cyclic nitrile-based compound, and a chain type nitrile-based compound to the organic solvent described above.

As used herein, the term "C$_5$-C$_{20}$ carbocyclic group" refers to a monocyclic or polycyclic group having 5 to 20 carbon atoms including only carbons as ring-forming atoms, and examples of the carbocyclic group include cyclopentane, cyclohexane, cycloheptane, and benzene.

As used herein, the term "C$_1$-C$_{20}$ alkyl group" refers to a linear or branched aliphatic monovalent hydrocarbon group having 1 to 20 carbon atoms, and examples of the alkyl group include a methyl group, an ethyl group, a propyl group, an isopropyl group, a butyl group, an isobutyl group, a tert-butyl group, a pentyl group, and a hexyl group.

As used herein, the term "C$_2$-C$_{20}$ alkenyl group" refers to a linear or branched monovalent hydrocarbon group having 2 to 20 carbon atoms including at least one double bond, and examples of the alkenyl group include an ethenyl group, a propenyl group, and a butenyl group.

As used herein, the term "C$_2$-C$_{20}$ alkynyl group" refers to a linear or branched monovalent hydrocarbon group having 2 to 20 carbon atoms including at least one triple bond, and examples of the alkynyl group include an ethenyl group, a propenyl group, and a butenyl group.

As used herein, the term "C$_1$-C$_{20}$ alkoxy group" refers to a monovalent group represented by the formula of —OR$_2$ (where, R$_2$ is a C$_1$-C$_{20}$ alkyl group), and examples of the alkoxy group include a methoxy group, an ethoxy group, and a propoxy group.

As used herein, the term "C$_3$-C$_{10}$ cycloalkyl group" refers to a monovalent saturated hydrocarbon cyclic group having 3 to 10 carbon atoms, and examples of the cycloalkyl group include a cyclopropyl group, a cyclobutyl group, and a cyclopentyl group.

In the present specification, at least one substituent of the substituted C$_1$-C$_{20}$ alkyl group, the substituted C$_2$-C$_{20}$ alkenyl group, the substituted C$_2$-C$_{20}$ alkynyl group, the substituted $C_1$-$C_{20}$ alkoxy group, and the substituted $C_3$-$C_{10}$ cycloalkyl group is selected from:

deuterium (-D), —F, —Cl, —Br, —I, a hydroxyl group, a nitro group, an amidino group, a hydrazino group, a hydrazono group, a $C_1$-$C_{20}$ alkyl group, a $C_2$-$C_{20}$ alkenyl group, a $C_2$-$C_{20}$ alkynyl group, and a $C_1$-$C_{20}$ alkoxy group;

a $C_1$-$C_{20}$ alkyl group, a $C_2$-$C_{20}$ alkenyl group, a $C_2$-$C_{20}$ alkynyl group, and a $C_1$-$C_{20}$ alkoxy group substituted with at least one selected from deuterium (-D), —F, —Cl, —Br, —I, a hydroxyl group, a nitro group, an amidino group, a hydrazino group, a hydrazono group, a $C_1$-$C_{20}$ alkyl group, a $C_2$-$C_{20}$ alkenyl group, a $C_2$-$C_{20}$ alkynyl group, and a $C_1$-$C_{20}$ alkoxy group;

a $C_3$-$C_{10}$ cycloalkyl group; and a $C_3$-$C_{10}$ cycloalkyl group substituted with at least one of deuterium (-D), —F, —Cl, —Br, —I, a hydroxyl group, a nitro group, an amidino group, a hydrazino group, a hydrazono group, a $C_1$-$C_{20}$ alkyl group, a $C_2$-$C_{20}$ alkenyl group, a $C_2$-$C_{20}$ alkynyl group, $C_1$-$C_{20}$ alkoxy group, and a $C_3$-$C_{10}$ cycloalkyl group.

A secondary battery according to another aspect includes a positive electrode; a negative electrode; and an organic electrolyte described above. The secondary battery may be a lithium secondary battery. The form of the lithium secondary battery is not particularly limited, and includes lithium secondary batteries such as lithium ion batteries, lithium ion polymer batteries, lithium sulfur batteries, and lithium air batteries, as well as lithium primary batteries.

The lithium secondary battery may have a capacity retention rate of 88% or greater after 300 cycles of charging/discharging at 45° C. For example, the lithium secondary battery may have a capacity retention rate of 89% or greater after 300 cycles of charging/discharging at 45° C.

For example, the secondary battery may be manufactured through the following method.

First, a positive electrode is prepared.

For example, a positive electrode active material composition in which a positive electrode active material, a conductive material, a binder, and a solvent are mixed is prepared. The positive electrode active material composition is directly applied on a metal current collector to prepare a positive electrode plate. Alternatively, the positive electrode active material composition may be cast on a separate support to form a film, which may then be separated from the support and laminated on a metal current collector to prepare a positive electrode plate. The positive electrode is not limited to the forms listed above, but may have forms other than the above forms.

The positive electrode active material is a lithium-containing metal oxide, and any one commonly used in the art may be used without limitation. For example, at least one of a complex oxide of lithium and a metal selected from cobalt, manganese, nickel, and a combination thereof may be used. Specific examples of the positive electrode active material may be a compound represented by any one of the following formulae: $Li_aA_{1-b}B_bD_2$ (where $0.90 \le a \le 1.8$ and $0 \le b \le 0.5$); $Li_aE_{1-b}B_bO_{2-c}D_c$ (where $0.90 \le a \le 1.8$, $0 \le b \le 0.5$, and $0 \le c \le 0.05$); $LiE_{2-b}B_bO_{4-c}D_c$ (where $0 \le b \le 0.5$ and $0 \le c \le 0.05$); $Li_aNi_{1-b-c}Co_bB_cD_\alpha$ (where $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (where $0.90 \le a \le 1.8$, $0 \le b \le 0.5$, $0 \le c \le 0.05$, and $0 \le \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (where $0.90 \le a \le 1.8$, $0 \le b \le 0.5$, $0 \le c \le 0.05$, and $0 \le \alpha \le 2$); $Li_aNi_bCo_cMn_dGeO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$ and $0.001 \le b \le 0.1$); $LiaCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.10$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In Formula above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, it may be $LiCoO_2$, $LiMn_xO_{2x}$(x=1, 2), $LiNi_{1-x}Mn_xO_{2x}$(0<x<1), $LiNi_{1-x-y}Co_xMn_yO_2$ ($0 \le x \le 0.5$, $0 \le y \le 0.5$), $LiFePO_4$, etc.

A compound having a coating layer on a surface thereof may be used, and a mixture of the compound and a compound having a coating layer may be used. The coating layer may include coating element compounds such as an oxide of a coating element, a hydroxide, an oxyhydroxide of a coating element, an oxycarbonate of a coating element, or a hydroxycarbonate of a coating element. The compounds forming the coating layers may be amorphous or crystalline. The coating element included in the coating layer may be Mg, Al, Co, K, Na, Ca, Si, Ti, V, Sn, Ge, Ga, B, As, Zr, or a mixture thereof. The forming of the coating layer may be performed through any methods (e.g., spray coating, dipping, etc.) that do not adversely affect the physical properties of a positive electrode active material, using the elements in the compounds, and the coating methods may be well understood by one of ordinary skill in the art, and thus a detailed description thereof will be omitted.

As the conductive material, carbon black, graphite fine particles, etc. may be used, but the embodiment is not limited thereto, and any conductive material which may be used as a conductive material in the art may be allowed.

Examples of the binder may include vinylidene fluoride/hexafluoropropylene copolymer, polyvinylidene fluoride (PVDF), polyacrylonitrile, polymethyl methacrylate, polytetrafluoroethylene, and a mixture thereof or styrene butadiene rubber-based polymer, but are not limited thereto, and any binder which may be used as a binder in the art may be allowed.

As the solvent, N-methylpyrrolidone (NMP), acetone, water, etc. may be used, but the embodiment is not limited thereto, and any solvent used in the art may be used.

The positive electrode active material, the conductive material, the binder, and the solvent are contained in an amount commonly used in lithium batteries. Depending on the usage and configuration of lithium batteries, at least one of the conductive material, the binder, and the solvent may be omitted.

Next, a negative electrode is prepared.

For example, a negative electrode active material composition in which a negative electrode active material, a conductive material, a binder, and a solvent are mixed is prepared. The negative electrode active material composition is directly applied on a metal current collector and dried to prepare a negative electrode plate. Alternatively, the negative electrode active material composition may be cast on a separate support to form a film, which may then be separated from the support and laminated on a metal current collector to prepare a negative electrode plate.

The negative electrode active material may be any material which may be used as a negative electrode active material for a lithium battery in the art. For example, the negative electrode active material may include at least one selected from the group consisting of lithium metal, a metal alloyable with lithium, transition metal oxide, non-transition metal oxide, and a carbon-based material.

For example, the metal alloyable with lithium may be Si, Sn, Al, Ge, Pb, Bi, Sb, Si—Y alloy (where, Y is an alkali metal, an alkali earth metal, a group 13 element, a group 14 element, a transition metal, a rare earth element, or a combination element thereof, but not Si), Sn—Y alloy (where, Y is an alkali metal, an alkali earth metal, a group 13 element, a group 14 element, a transition metal, a rare earth element, or a combination element thereof, but not Sn), etc. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be lithium titanium oxide, vanadium oxide, lithium vanadium oxide, etc.

For example, the non-transition metal oxide may be $SnO_2$, $SiO_x(0<x<2)$, etc.

The carbon-based material may be crystalline carbon, amorphous carbon, or a mixture thereof. The crystalline carbon may be graphite such as amorphous, plate-like, flake, spherical or fiber-type natural graphite or artificial graphite, and the amorphous carbon is soft carbon (low temperature fired carbon) or hard carbon, mesophase pitch carbide, fired coke, etc.

In the negative active material composition, the conductive material and the binder may be the same as those of the positive active material composition.

The negative electrode active material, the conductive material, the binder, and the solvent are contained in an amount commonly used in lithium batteries. Depending on the usage and configuration of lithium batteries, at least one of the conductive material, the binder, and the solvent may be omitted.

Next, a separator to be inserted between the positive electrode and the negative electrode is prepared.

The separator may be any separator commonly used for lithium batteries. Separators having low resistance to ion migration of an electrolyte and excellent electrolyte wettability may be used. For example, the separator may be selected from glass fiber, polyester, teflon, polyethylene, polypropylene, polytetrafluoroethylene (PTFE), or a combination thereof, and may be in the form of a nonwoven fabric or a woven fabric. For example, a windable separator such as polyethylene and polypropylene may be used for a lithium ion battery, and a separator having an excellent organic electrolytic solution-retaining capability may be used for a lithium-ion polymer battery. For example, the separator may be prepared through the following method.

A polymer resin, a filler, and a solvent are mixed to prepare a separator composition. The separator composition may be directly applied on an electrode and dried to form a separator. Alternatively, the separator composition may be cast on a support and then dried to form a separator film, which may then be separated from the support and laminated on an electrode to form the separator.

The polymer resin used in forming the separator may not be particularly limited, and may be any one of various materials which are used as a binder of an electrode plate. Examples of the polymer resin may include vinylidenefluoride/hexafluoropropylene copolymer, polyvinylidenefluoride (PVDF), polyacrylonitrile, polymethylmetacrylate, or a mixture thereof.

Next, the organic electrolyte described above is prepared.

As shown in FIG. 1, a lithium battery 1 includes a positive electrode 3, a negative electrode 2, and a separator 4. The positive electrode 3, the negative electrode 2, and the separator 4 described above are wound or folded to be placed in a battery case 5. Then, the battery case 5 is filled with an organic electrolyte and sealed with a cap assembly 6, thereby completing the manufacture of the lithium battery 1. The battery case 5 may be a cylindrical type, a rectangular type, or a thin film type. For example, the lithium battery may be a large thin film type battery. The lithium battery may be a lithium ion battery.

The separator is positioned between the positive electrode and the negative electrode such that a battery assembly may be formed. Several of the battery assemblies may be stacked to form a bi-cell structure and then impregnated with the organic electrolyte, and the resultant product is placed in a pouch, followed by sealing, thereby completing the manufacture of a lithium ion polymer battery.

In addition, the plurality of battery assemblies may be stacked to form a battery pack, and the battery pack may be used for any high-capacity and high-output devices. For example, the battery pack may be used for a notebook computer, a smartphone, or an electric vehicle.

In addition, the lithium battery may be used in an electric vehicle (EV) due to its lifespan characteristics and high-rate characteristics. For example, the lithium battery may be used in a hybrid vehicle such as a plug-in hybrid electric vehicle (PHEV). In addition, the lithium battery may be used in the arts requiring a large amount of electricity storage. In addition, the lithium battery may be used for electric bicycles, power tools, etc.

Examples and Comparative Examples below are used for more detailed descriptions of the present invention. However, Examples are for illustrative purposes only to describe the present invention and are not intended to limit the scope of the present invention.

(Preparation of Organic Electrolyte)

Preparation Example 1

1.3 M $LiPF_6$ as a lithium salt, 1 wt % of 1,3,5-cyclohexanetricarbonitrile as a cyclic nitrile-based compound, 3 wt % of 1,3,6-hexanetricarbonitrile and 2 wt % of succinonitrile as a chain type nitrile-based compound were added to a mixed solution of EC/PC/EP/PP (volume ratio: EC/PC/EP/PP=15/15/25/45), thereby preparing an organic electrolyte.

Preparation Example 2

An organic electrolyte was prepared in the same manner as in Preparation Example 1, except that 1,3,5-cyclohexanetricarbonitrile was added in an amount of 2 wt % instead of 1 wt %.

Preparation Example 3

1.3 M $LiPF_6$ as a lithium salt was added to a mixed solution of EC/PC/EP/PP (volume ratio: EC/PC/EP/PP=15/15/25/45), thereby preparing an organic electrolyte.

Preparation Example 4

1.3 M $LiPF_6$ as a lithium salt and 1 wt % of 1,3,5-cyclohexanetricarbonitrile were added to a mixed solution of EC/PC/EP/PP (volume ratio: EC/PC/EP/PP=15/15/25/45), thereby preparing an organic electrolyte.

Preparation Example 5

1.3 M LiPF$_6$ as a lithium salt and 3 wt % of 1,3,6-hexanetricarbonitrile were added to a mixed solution of EC/PC/EP/PP (volume ratio: EC/PC/EP/PP=15/15/25/45), thereby preparing an organic electrolyte.

Preparation Example 6

1.3 M LiPF$_6$ as a lithium salt and 2 wt % of succinonitrile were added to a mixed solution of EC/PC/EP/PP (volume ratio: EC/PC/EP/PP=15/15/25/45), thereby preparing an organic electrolyte.

Preparation Example 7

1.3 M LiPF$_6$ as a lithium salt, 3 wt % of 1,3,6-hexanetricarbonitrile and 2 wt % of succinonitrile as a chain nitrile-based compound were added to a mixed solution of EC/PC/EP/PP (volume ratio: EC/PC/EP/PP=15/15/25/45), thereby preparing an organic electrolyte.

Preparation Example 8

An organic electrolyte was prepared in the same manner as in Preparation Example 7, except that succinonitrile was added in an amount of 3 wt % instead of 2 wt %.

Preparation Example 9

An organic electrolyte was prepared in the same manner as in Preparation Example 7, except that succinonitrile was added in an amount of 4 wt % instead of 2 wt %.

Preparation Example 10

An organic electrolyte was prepared in the same manner as in Preparation Example 7, except that succinonitrile was added in an amount of 5 wt % instead of 2 wt %.

Preparation Example 11

An organic electrolyte was prepared in the same manner as in Preparation Example 1, except that 1,3,6-hexanetricarbonitrile was added in an amount of 5 wt % instead of 3 wt %.

Preparation Example 12

1.3 M LiPF$_6$ as a lithium salt and 0.5 wt % of cyclobutane 1,2-carbonitrile compound as a cyclic nitrile-based compound were added to a mixed solution of EC/PC/EP/PP (volume ratio: EC/PC/EP/PP=15/15/25/45), thereby preparing an organic electrolyte.

Preparation Example 13

1.3 M LiPF$_6$ as a lithium salt, 3 wt % of 1,3,6-hexanetricarbonitrile as a chain nitrile-based compound, and 1 wt % of divinylsulfone compound as an additive were added to a mixed solution of EC/PC/EP/PP (volume ratio: EC/PC/EP/PP=15/15/25/45), thereby preparing an organic electrolyte.

(Preparation of Positive Electrode Half-Cell)

Reference Example 1

A positive electrode half-cell was prepared by using a positive electrode containing lithium cobalt oxide and a lithium foil as a counter electrode, placing a porous polyethylene film as a separator between the positive electrode and the counter electrode, and injecting the organic electrolyte obtained in Preparation Example 3, thereby preparing a positive electrode half-cell.

REFERENCE EXAMPLES 2 to 4

A positive electrode half-cells were prepared in the same manner as in Reference Example 1, except that the organic electrolytes obtained in Preparation Examples 4 to 6 were respectively used instead of the organic electrolyte obtained in Preparation Example 3.

(Preparation of Negative Electrode Half-Cell)

Reference Example 5

A negative electrode half-cell was prepared by using a negative electrode containing graphite and a lithium metal as a counter electrode, placing a porous polyethylene film as a separator between the negative electrode and the counter electrode, and injecting the organic electrolyte obtained in Preparation Example 3, thereby preparing a negative electrode half-cell.

REFERENCE EXAMPLES 6 to 8

A negative electrode half-cells were prepared in the same manner as in Reference Example 5, except that the organic electrolytes obtained in Preparation Examples 4 to 6 were respectively used instead of the organic electrolyte obtained in Preparation Example 3.

Evaluation Example 1

Electrochemical Decomposition Evaluation of Positive Electrode Half-Cell

Cyclic voltammetry characteristics were evaluated for 5 cycles at 3 V to 4.55 V, using the positive electrode half-cells prepared in Reference Examples 1 to 4. Results are shown in FIGS. 2A to 2D.

Figure 2A:
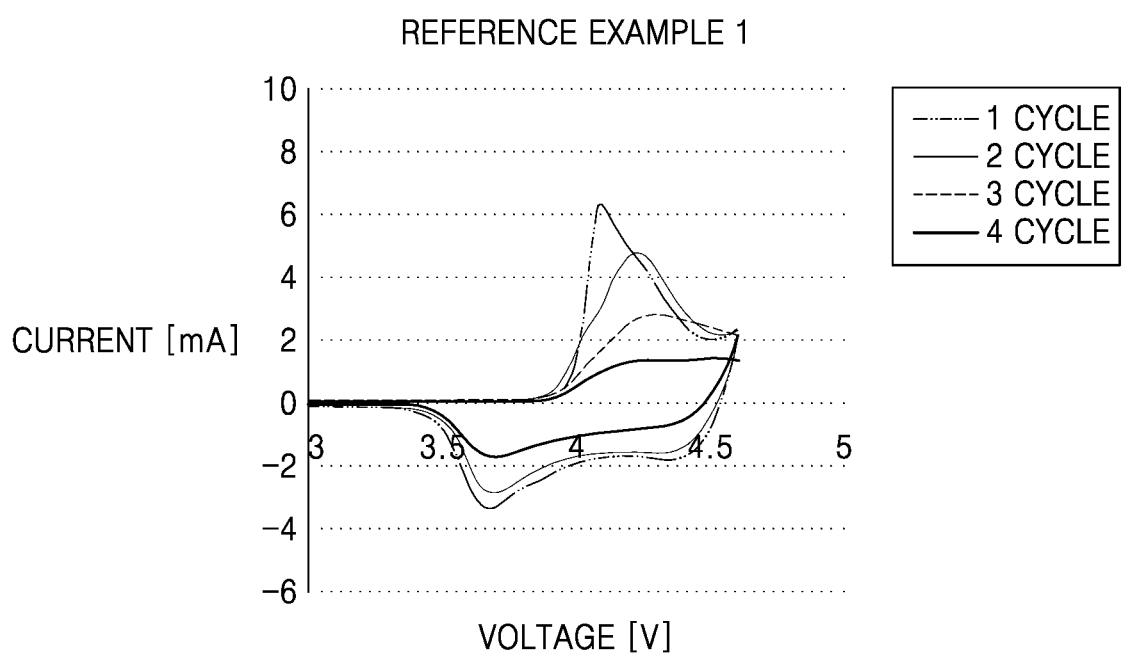
FIGS. 2A to 2D are graphs showing results of measuring cyclic voltammetry characteristics for 5 cycles at 3 V to 4.55 V of positive electrode half-cells manufactured in Reference Examples 1 to 4.
Figure 2B:
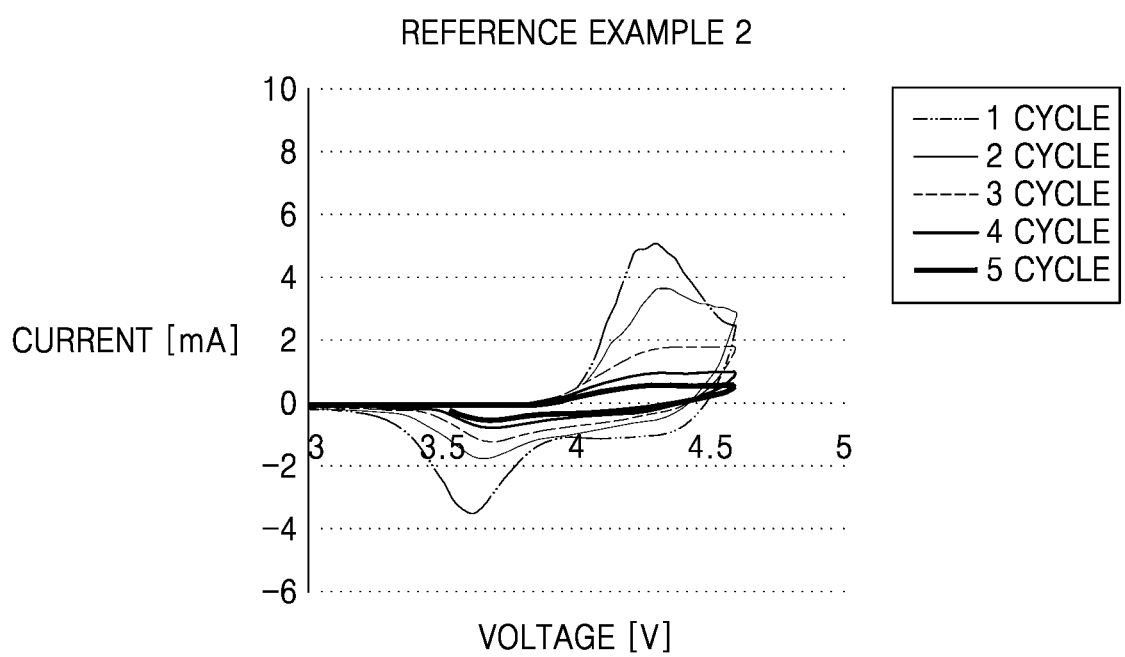
Figure 2C:
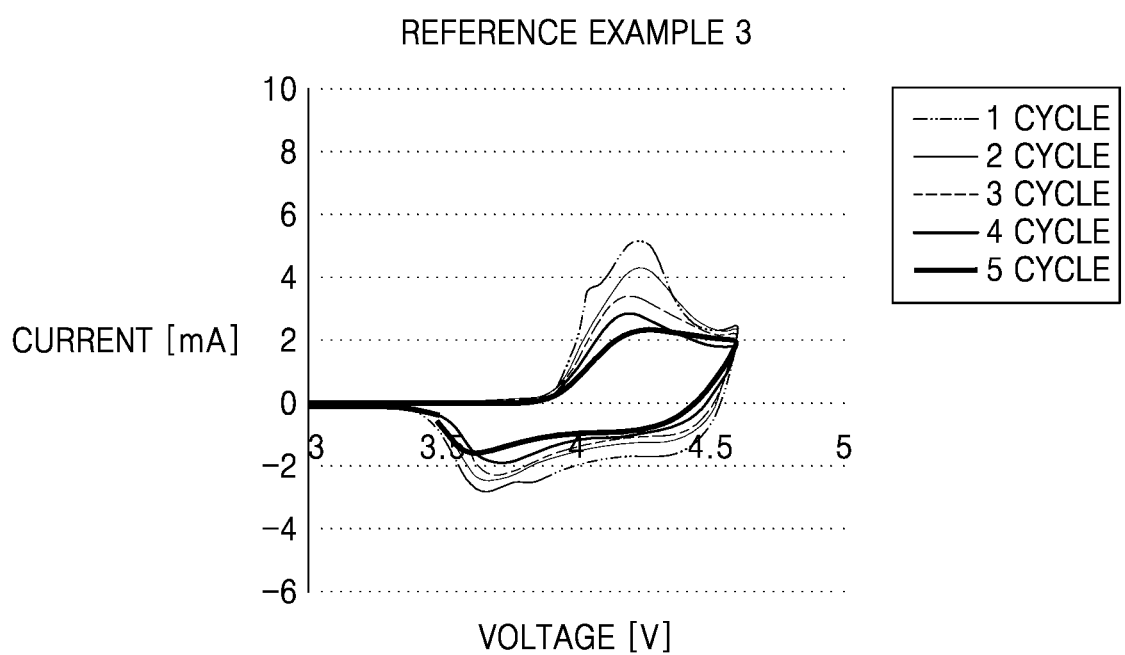
Figure 2D:
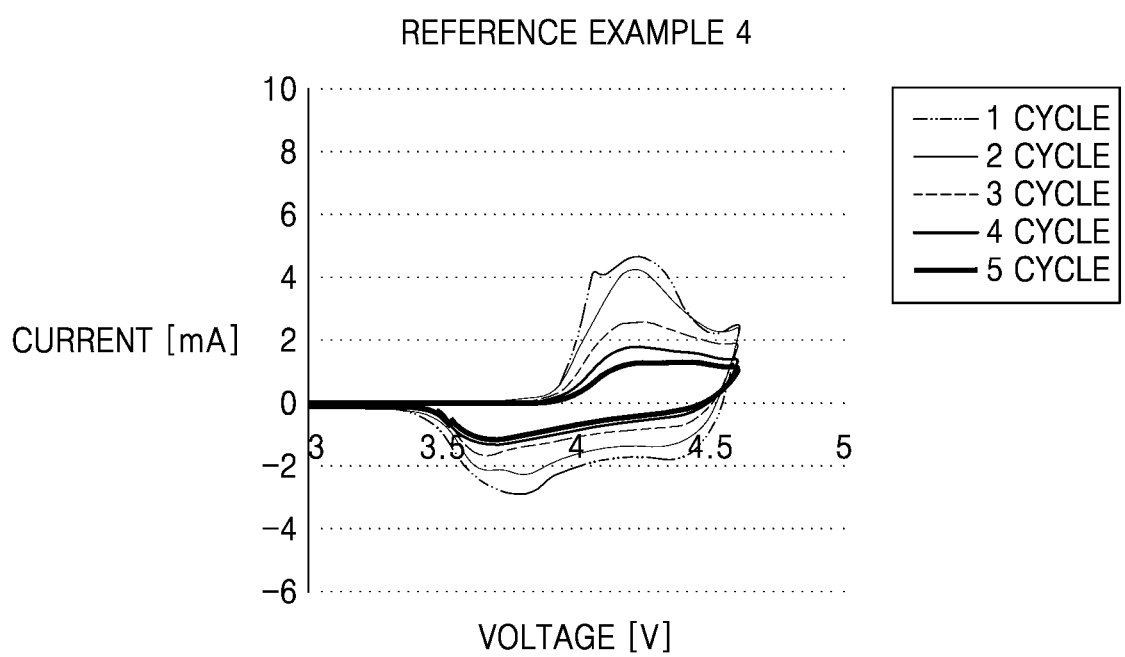

Referring to FIGS. 2A to 2D, it is seen that the organic electrolyte containing 1,3,5-cyclohexanetricarbonitrile (FIG. 2B) had lower reversibility of a positive electrode oxidation-reduction reaction than the organic electrolyte containing 1,3,6-hexanetricarbonitrile (FIG. 2C) or succinonitrile (FIG. 2D). In particular, referring to FIG. 2B, it is seen that, in the organic electrolyte containing 1,3,5-cyclohexanetricarbonitrile, an initial reduction reaction hardly occurs at 4 V. It is assumed that this is caused due to increased resistance as the organic electrolyte containing 1,3,5-cyclohexanetricarbonitrile forms a film on a surface of the positive electrode.

Evaluation Example 2

Electrochemical Decomposition Evaluation of Negative Electrode Half-Cell

Cyclic voltammetry characteristics were evaluated for 5 cycles at 3 V to 0 V, using the negative electrode half-cells prepared in Reference Examples 5 to 8. Results are shown in FIGS. 3A to 3D.

Figure 3A:
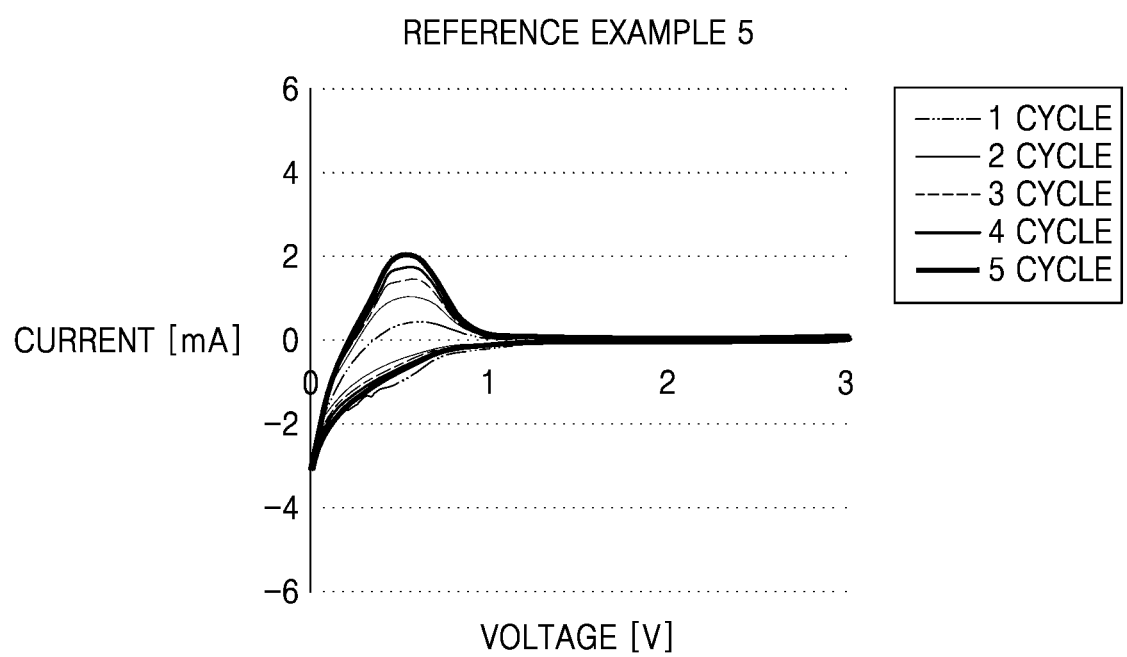
FIGS. 3A to 3D are graphs showing results of measuring cyclic voltammetry characteristics for 5 cycles at 3 V to 0 V of negative electrode half-cells manufactured in Reference Examples 5 to 8.
Figure 3B:
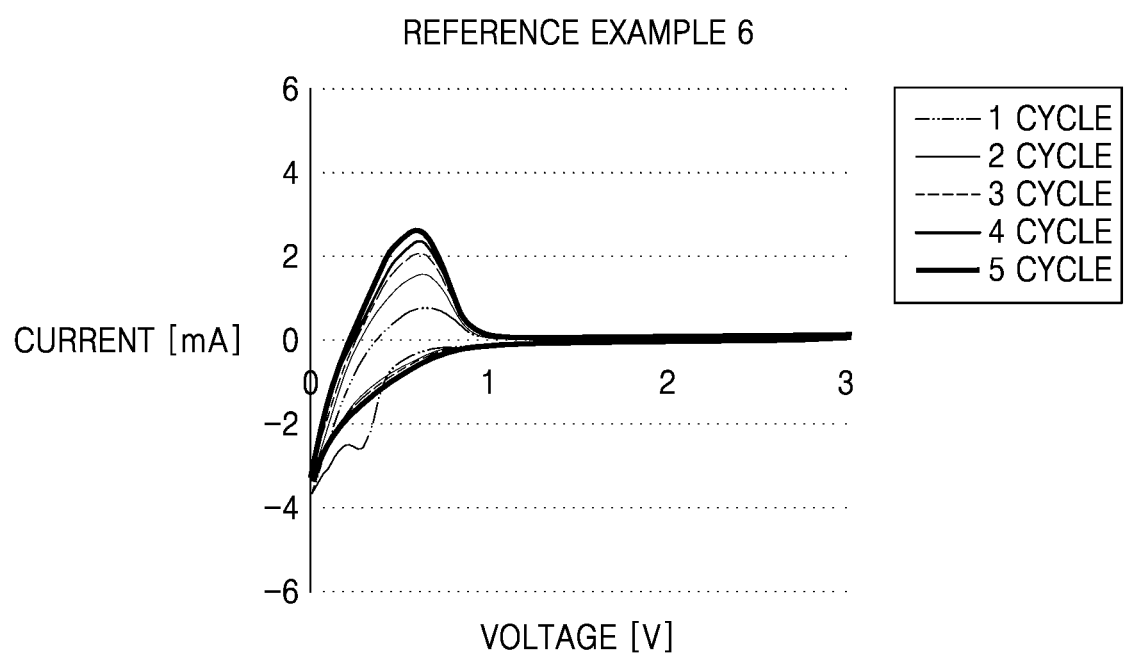
Figure 3C:
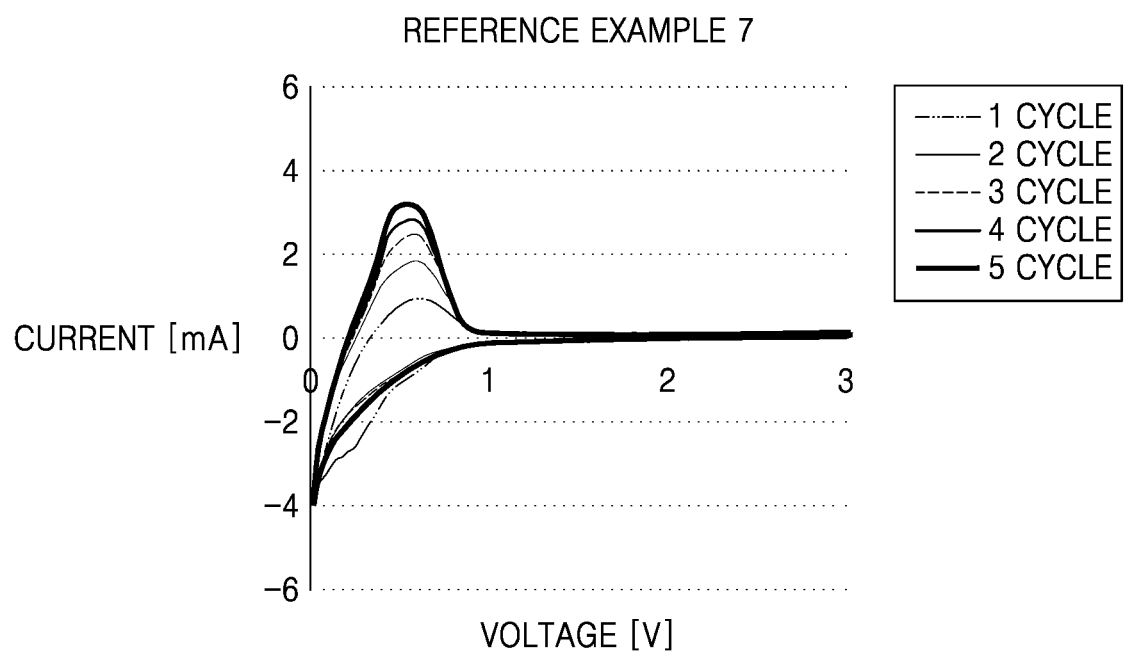
Figure 3D:
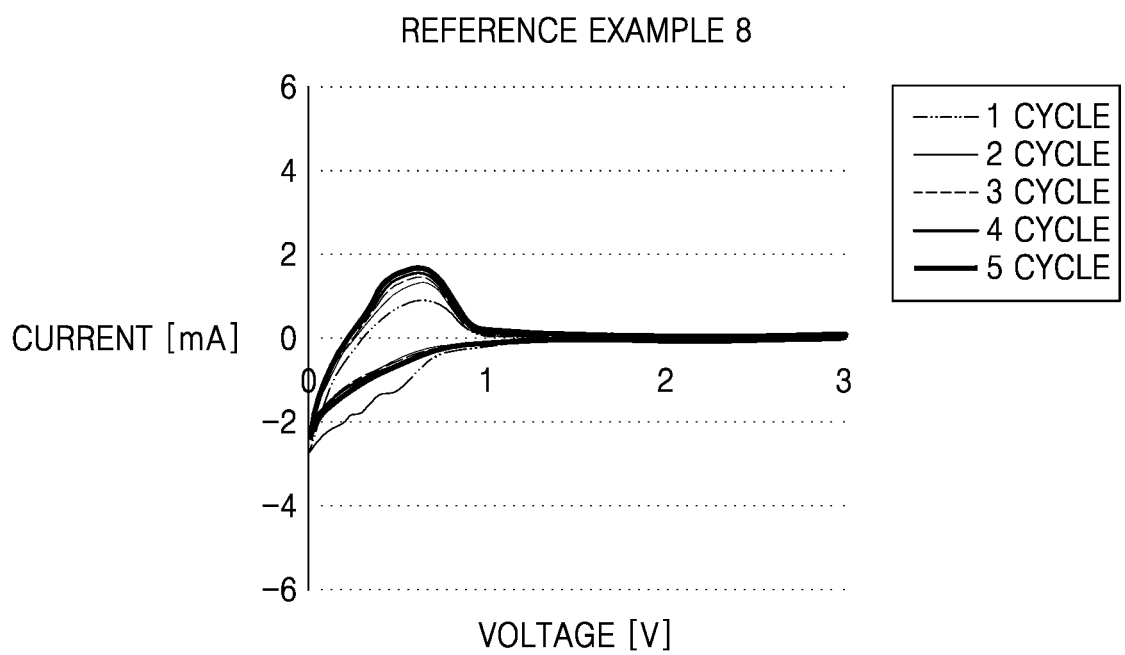

Referring to FIGS. 3A to 3D, given that there is no significant difference between the initial reduction peak in FIG. 3A and the initial reduction peak in FIGS. 3B to 3D, it is interpreted that the cyclic and chain type nitrile-based compounds do not directly form a film on the negative electrode. In addition, given that the peak intensity in FIGS. 3B and 3C is higher than the peak intensity in FIG. 3A including only the organic solvent, it is seen that the addition of 1,3,5-cyclohexanetricarbonitrile (FIG. 3B) or 1,3,6-hexanetricarbonitrile (FIG. 3C) helps the negative electrode reversibility.

(Preparation of Full-Cell)

Example 1

(Preparation of Negative Electrode)

98 wt % of artificial graphite (BSG-L, Tianjin BTR New Energy Technology Co., Ltd.) 1.0 wt % of styrene-butadiene rubber (SBR) binder (ZEON), and 1.0 wt % of carboxymethyl cellulose (CMC, NIPPON A&L) were mixed and the mixture was added to distilled water and stirred for 60 minutes using a mechanical stirrer, thereby preparing a negative electrode active material slurry. The slurry was applied at a thickness of about 60 µm on a 10 µm-thick copper current collector, using a doctor blade, dried in a hot air dryer at 100° C. for 0.5 hours, dried again under vacuum at 120° C. for 4 hours, and then roll pressed, thereby preparing a negative electrode plate.

(Preparation of Positive Electrode)

97.45 wt % of $LiNi_{1/3}Al_{1/3}O_2$, 0.5 wt % of artificial graphite (SFG6, Timcal) powder as a conductive material, 0.7 wt % of carbon black (Ketjenblack, ECP), 0.25 wt % of modified acrylonitrile rubber (BM-720H, Zeon Corporation), 0.9 wt % of polyvinylidene fluoride (PVdF, S6020, Solvay), 0.2 wt % of polyvinylidene fluoride (PVdF, S5130, Solvay) were mixed, and the mixture was added to an N-methyl-2-pyrrolidone solvent and stirred for 30 minutes, using a mechanical stirrer, thereby preparing a positive electrode active material slurry. The slurry was applied at a thickness of about 60 µm on a 20 µm-thick aluminum current collector, using a doctor blade, dried in a hot air dryer at 100° C. for 0.5 hours, dried again under vacuum at 120° C. for 4 hours, and then roll pressed, thereby preparing a positive electrode plate.

A lithium battery was manufactured using the 14 µm-thick polyethylene separator coated with ceramic on the positive electrode side as a separator and the organic electrolyte prepared in Preparation Example 1 as an electrolyte.

Example 2

A lithium battery was manufactured in the same manner as in Example 1, except that the organic electrolyte prepared in Preparation Example 2 was used instead of the organic electrolyte prepared in Preparation Example 1.

COMPARATIVE EXAMPLES 1 to 7

A lithium battery was manufactured in the same manner as in Example 1, except that the organic electrolytes prepared in Preparation Examples 7 to 13 were respectively used instead of the organic electrolyte prepared in Preparation Example 1.

Evaluation Example 3

Initial DC Resistance (DC-IR) Evaluation at Room Temperature (25° C.)

Constant current charging was performed on the lithium batteries manufactured in Examples 1 and 2, and Comparative Examples 1 to 7 at a constant current of 0.7 C rate at 25° C. up to 4.47 V (vs. Li), and the charging was cut off at a current of 25 C rate while keeping the voltage of 4.47 V in a constant voltage mode. Then, discharging was performed at a constant current of 0.2 C rate up to 3 V (vs. Li) at the time of discharging to measure standard capacity.

The standard capacity refers to capacity obtained when constant current charging was performed at a rate of 0.7 C up to 4.47 V, and the charging was cut off at a current of 0.025 C rate while keeping the voltage of 4.47 V in a constant voltage mode, followed by 3V cut off discharging at 0.2C rate.

Then, charging was performed under the same conditions as the standard capacity, and discharging was performed at a constant current of 0.1 C rate up to 3.4 V (vs. Li) at the time of discharging. Thereafter, direct current internal resistance (DC-IR) was measured through the following method.

Constant current charging was performed at a rate of 0.7 C up to 4.47 V based on used capacity, and then the charging was cut off at a current of 0.025 C rate while keeping the voltage of 4.47 V in a constant voltage mode. Thereafter, discharging was performed for 3 hours, 5 hours, and 1 hour at 0.1 C rate based on used capacity, and discharging was performed for 1 second respectively at a current of 1 C rate based on the standard capacity at 70%, 20%, and 10% of SOC. The current applied during 1 second discharging at 1 C rate, and changes in voltage at that point were measured, and DC-IR was calculated based on Equation 1 below.

$$DC\text{-}IR=(V2-V1)/I \qquad \text{Equation 1}$$

V1 is a last voltage during 1 second discharging of standard capacity 1 C rate, V2 is a voltage before 1 second discharging of standard capacity 1 C rate starts, and I is a current difference between standard capacity 1 C rate and used capacity 0.1 C rate.

Evaluation Example 4

Evaluation of Charging/Discharging Characteristics at Room Temperature (25° C.)

Constant current charging was performed on the lithium batteries manufactured in Examples 1 and 2, and Comparative Examples 1 to 7 at a constant current of 0.7 C rate at 25° C. up to 4.47 V (vs. Li), and the charging was cut off at a current of 0.025 C rate while keeping the voltage of 4.47 V in a constant voltage mode. Then, discharging was performed at a constant current of 0.2 C rate up to 3 V (vs. Li) at the time of discharging, thereby completing the formation process.

The lithium batteries subjected to the formation process were charged at a constant current of 0.7 C rate at 25° C. up to 4.47 V (vs. Li), and the charging was cut off at a current of 0.025 C rate while keeping the voltage of 4.47 V in a constant voltage mode. Then, discharging was performed at a constant current of 1.0 C rate up to 3 V (vs. Li) at the time of discharging. This cycle of charging/discharging was repeatedly performed 300 times.

A rest period of 10 minutes was given after one cycle of charging/discharging across all the above charging/discharging cycles.

Results of the charging/discharging experiments are shown in Table 1 and FIG. 4 below. The capacity retention rate at the $300^{th}$ cycle is defined by Equation 2 below.

Capacity retention rate=(discharge capacity at 300th cycle/discharge capacity at $1^{st}$ cycle)×100     Equation 2

Along with charging/discharging characteristics at room temperature, changes in thickness after 300 cycles of charging/discharging of the lithium battery cells were measured to calculate swelling ratio. The swelling ratio indicates changes in thickness of the lithium batteries after 300 cycles of charging/discharging compared to thickness of an initial lithium battery.

Figure 4:
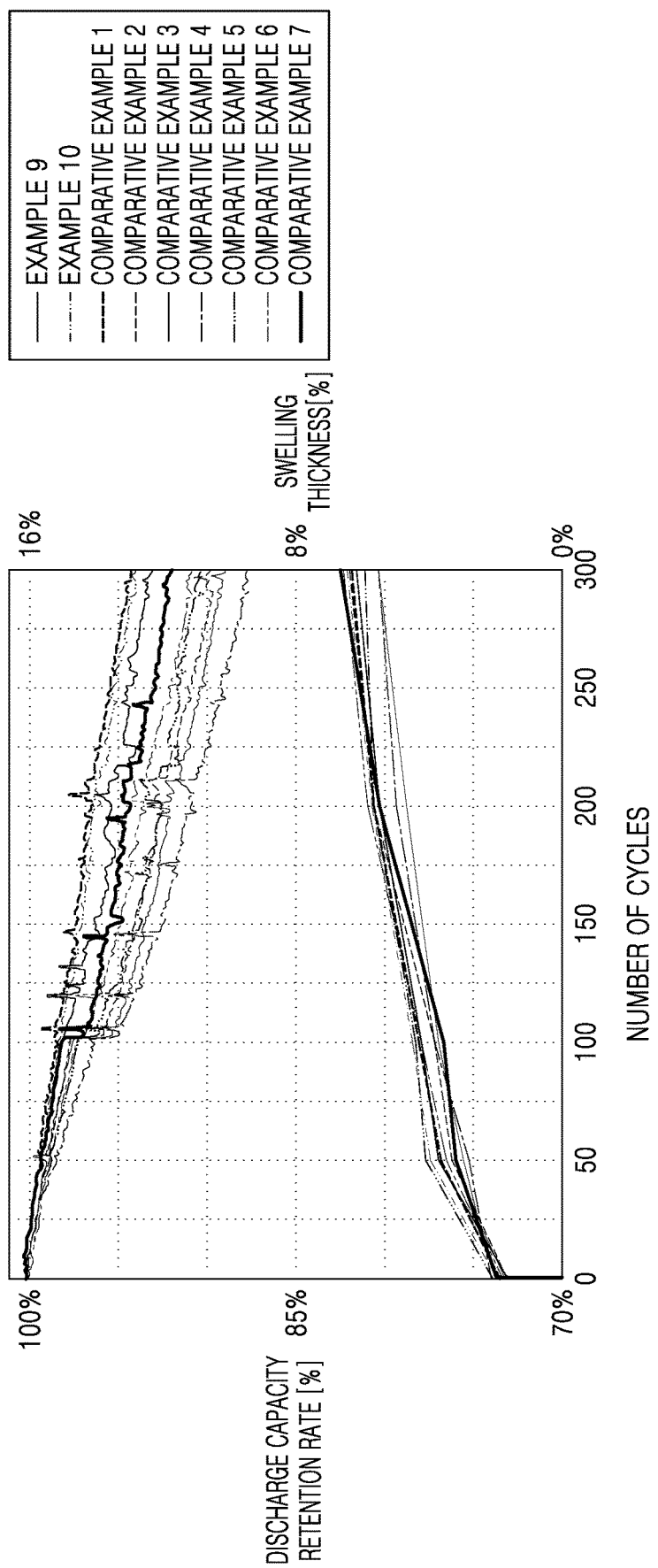
FIG. 4 is a graph showing evaluation of room temperature (25° C.) lifespan characteristics of lithium batteries manufactured in Examples 1 and 2 and Comparative Examples 1 to 7.

Referring to Table 1 and FIG. 4, Examples 1 and 2 showed a higher discharge capacity retention rate than Comparative Examples 2 to 7, and exhibited better swelling characteristics than Comparative Example 1.

Evaluation Example 5

Charging/Discharging Characteristics at High Temperature (45° C.)

Constant current charging was performed on the lithium batteries manufactured in Examples 1 and 2, and Comparative Examples 1 to 7 at a constant current of 0.7 C rate at 45° C. up to 4.47 V (vs. Li), and the charging was cut off at a current of 0.025 C rate while keeping the voltage of 4.47 V in a constant voltage mode. Then, discharging was performed at a constant current of 0.2 C rate up to 3 V (vs. Li) at the time of discharging, thereby completing the formation process.

The lithium batteries subjected to the formation process were charged at a current of 0.7 C rate at 25° C. up to 4.47 V (vs. Li), and the charging was cut off at a current of 0.025 C rate while keeping the voltage of 4.47 V in a constant voltage mode. Then, discharging was performed at a constant current of 1.0 C rate up to 3 V (vs. Li) at the time of discharging. This cycle of charging/discharging was repeatedly performed 300 times.

A rest period of 10 minutes was given after one cycle of charging/discharging across all the above charging/discharging cycles.

Results of the charging/discharging experiments are shown in Table 1 and FIG. 5 below.

Along with charging/discharging characteristics at high temperature, changes in thickness after 300 cycles of charging/discharging of the lithium battery cells were measured to calculate swelling ratio.

Figure 5:
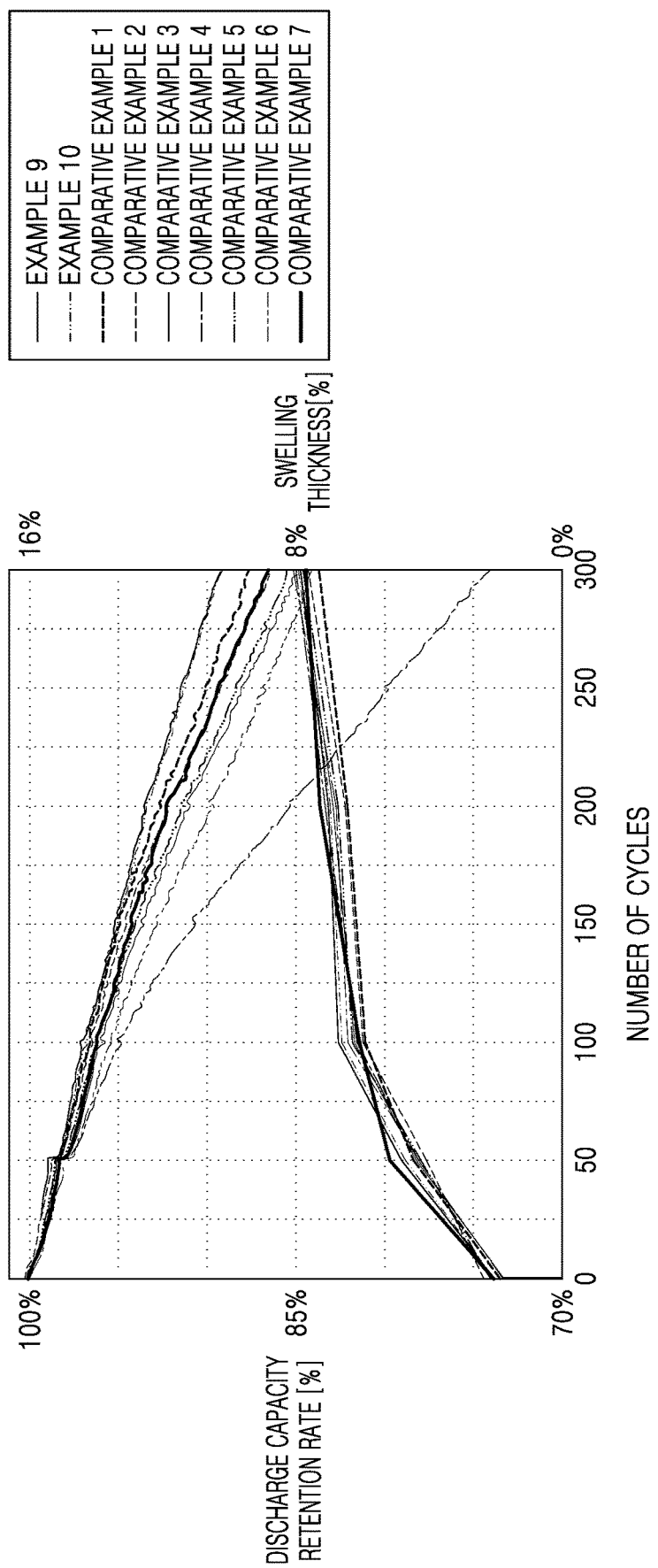
FIG. 5 is a graph showing evaluation of high temperature (45° C.) lifespan characteristics of lithium batteries manufactured in Examples 1 and 2 and Comparative Examples 1 to 7.

Referring to Table 1 and FIG. 5, it is seen that Examples 1 and 2 are the best in terms of discharge capacity and lifespan inclination at high temperature. There was no significant difference in swelling characteristics. Examples 1 and 2 had a better discharge capacity and lifespan inclination than Comparative Examples 1 to 7 in high temperature lifespan evaluation, unlike room temperature lifespan evaluation, and it is assumed that this is because the high temperature lifespan is mainly affected by deterioration of an active material and film characteristics. That is, the cyclic nitrile-based compound added in Examples 1 and 2 forms a stable film on the positive electrode at high temperature to suppress the deterioration of the active material, and accordingly it is assumed that Examples 1 and 2 have a better discharge capacity and high temperature lifespan inclination than Comparative Examples 1 to 7.

Evaluation Example 6

Stability Evaluation at High Temperature (60° C.)

Constant current charging was performed on the lithium batteries manufactured in Examples 1 and 2, and Comparative Examples 1 to 7 at a current of 0.7 C rate at 45° C. up to 4.47 V (vs. Li), and the charging was cut off at a current of 0.025 C rate while keeping the voltage of 4.47 V in a constant voltage mode. Then, discharging was performed at a constant current of 0.2 C rate up to 3 V (vs. Li) at the time of discharging, thereby completing the formation process.

At the $2^{nd}$ cycle, constant current charging was performed at a rate of 0.7 C up to 4.47 V, and then constant voltage charging was performed up to 0.025 C while keeping the voltage of 4.47 V, and constant current discharging was performed at a rate of 0.2 C up to 3 V. The discharge capacity at the $2^{nd}$ cycle was considered the standard capacity.

At the $3^{rd}$ cycle, constant current charging was performed at a rate of 0.7 C up to 4.47 V, and then constant voltage charging was performed up to 0.025 C while keeping the voltage of 4.47 V, The charged lithium batteries stored in an oven at 60° C. for 4 weeks and then taken out were discharged at a rate of 0.2 C up to 3 V at the $3^{rd}$ cycle.

At the $4^{th}$ cycle, constant current charging was performed at a rate of 0.7 C up to 4.47 V, and then constant voltage charging was performed up to 0.025 C while keeping the voltage of 4.47 V, and constant current discharging was performed at a rate of 0.2 C up to 3 V.

Figure 6A:
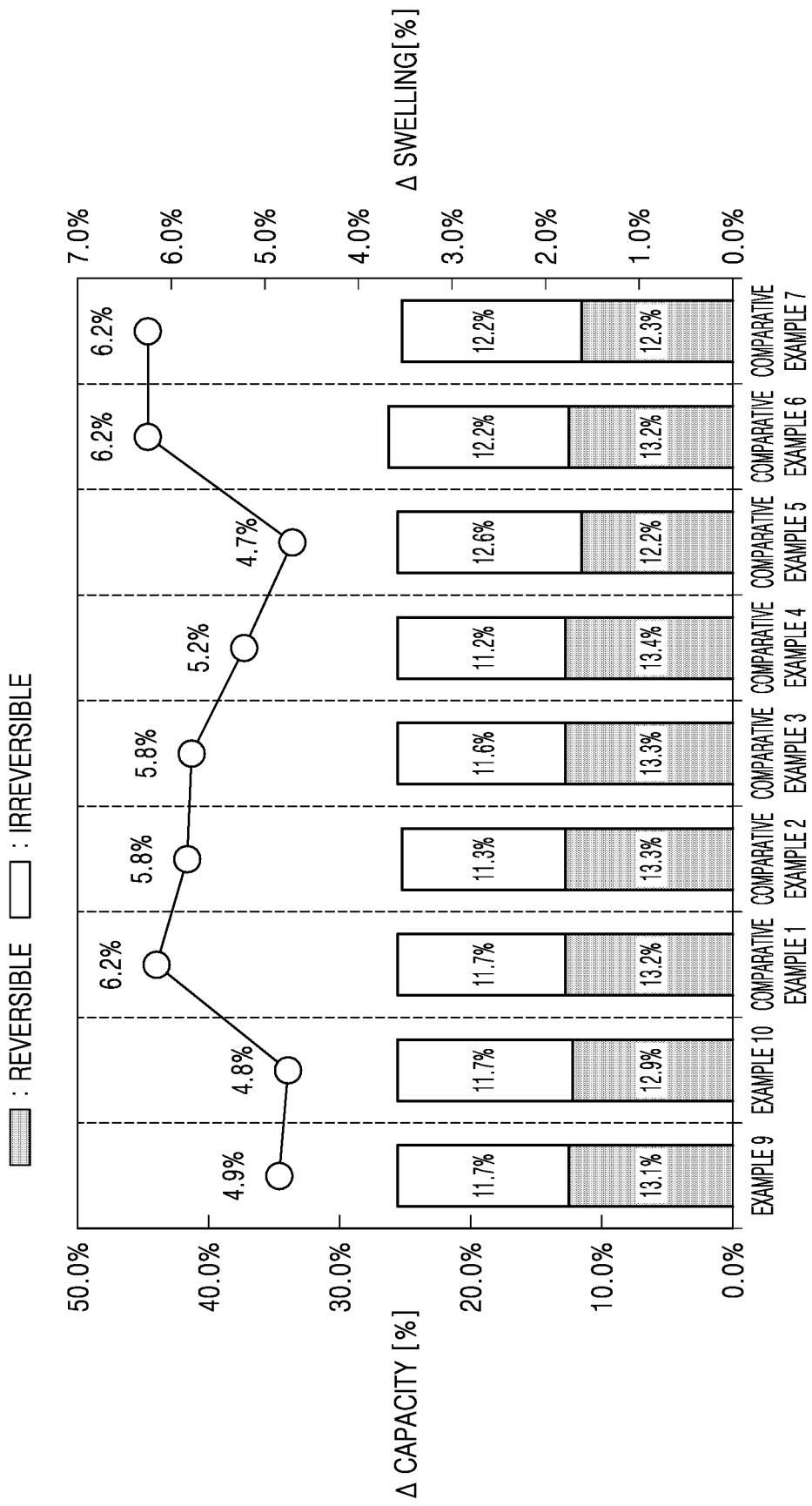
FIGS. 6A to 6C are graphs showing measurement of swelling characteristics, capacity retention rates, and capacity recovery rates after storing the lithium batteries manufactured in Examples 1 and 2 and Comparative Examples 1 to 7 at high temperature (60° C.) for 4 weeks.
Figure 6B:
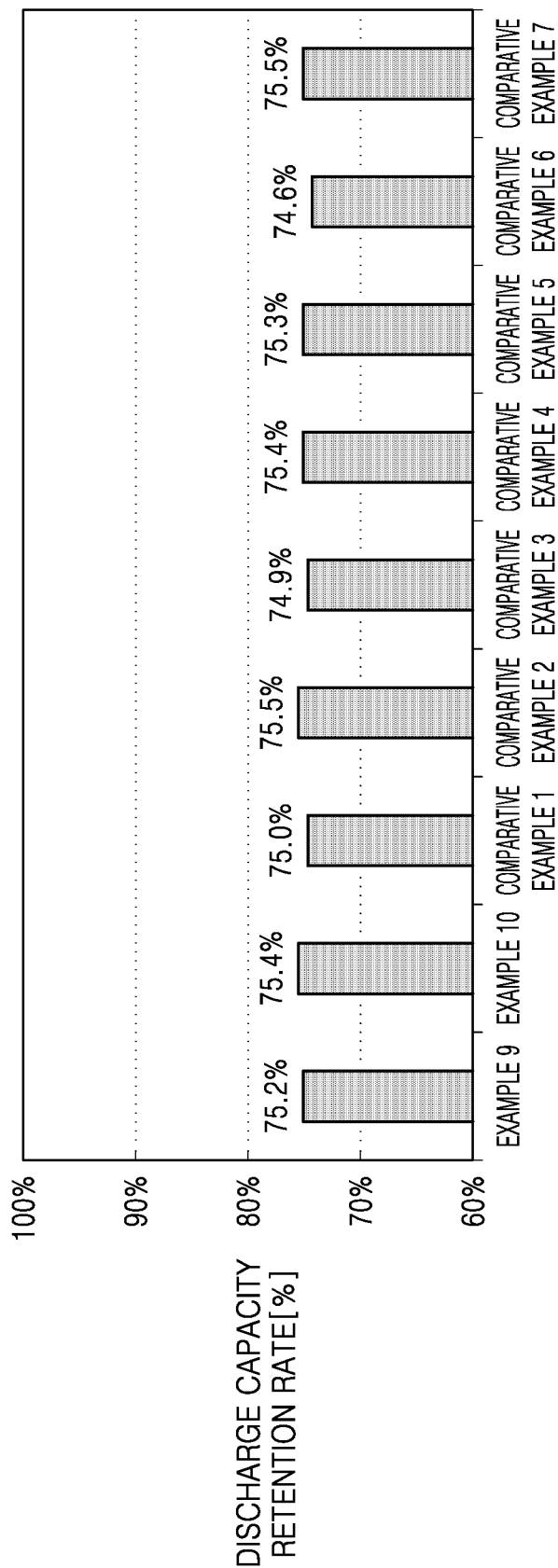
Figure 6C:
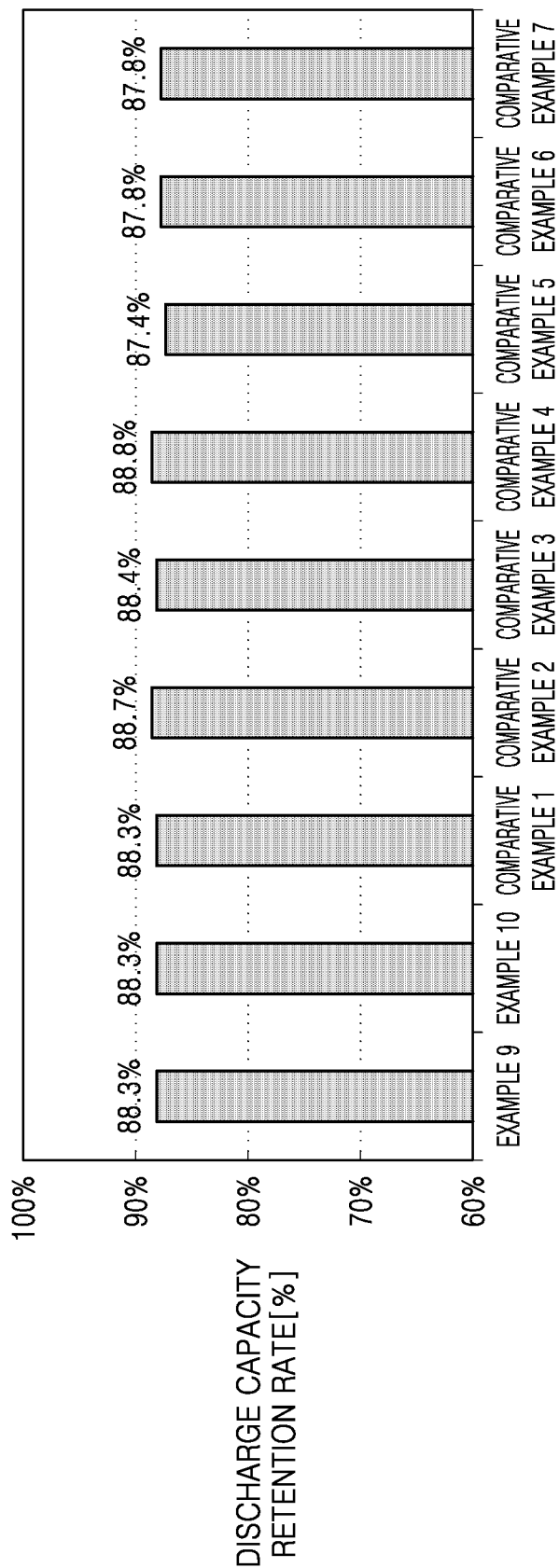

Results of the charging/discharging evaluation are shown in Table 1 and FIGS. 6A to 6C. The capacity retention rate after high temperature storage is defined by Equation 3 below. In addition, capacity recovery rate was calculated through the 4th cycle of charging/discharging after high temperature storage for 4 weeks. The capacity recovery rate is defined by Equation 4 below.

$$\text{Capacity retention rate [\%]} = [\text{discharge capacity after high temperature at } 3^{rd} \text{ cycle/standard capacity}] \times 100 \text{ (the standard capacity is the discharge capacity at } 2^{nd} \text{ cycle)} \quad \text{Equation 3}$$

$$\text{Capacity recovery rate} = (\text{discharge capacity at } 4^{th} \text{ cycle/discharge capacity after high temperature at } 3^{rd} \text{ cycle}) \times 100 \quad \text{Equation 4}$$

Referring to Table 1 and FIGS. 6A to 6C, it is seen that the swelling characteristics of Examples 1 and 2 are the best after 4 weeks of storage at high temperature. In particular, given that Example 2 has more improved swelling characteristics than Example 1, it is assumed that the swelling characteristics will be improved with a greater amount of the cyclic nitrile-based compound. In addition, the capacity retention rate and the capacity recovery rate after high temperature storage showed similar values in both Examples and Comparative Examples, and given that Example 1 has a higher capacity retention rate than Example 2, it is assumed that the capacity retention rate will be higher with a greater amount of the cyclic nitrile-based compound.

Evaluation Example 7

Stability Evaluation After Storage at High Temperature (60° C.)

Constant current charging was performed on the lithium batteries manufactured in Examples 1 and 2, and Comparative Examples 1 to 7 at a current of 0.7 C rate at 25° C. up to 4.47 V (vs. Li), and the charging was cut off at 0.025 C rate while keeping the voltage of 4.47 V in a constant voltage mode to be done up to 100% of state of charge (SOC).

Direct Current Internal Resistance (DC-IR) evaluation of the charged lithium batteries and high temperature storage EIS evaluation of the charged lithium batteries stored in an oven at 60° C. for 1 week and 4 weeks and then taken out were performed.

Figure 7A:
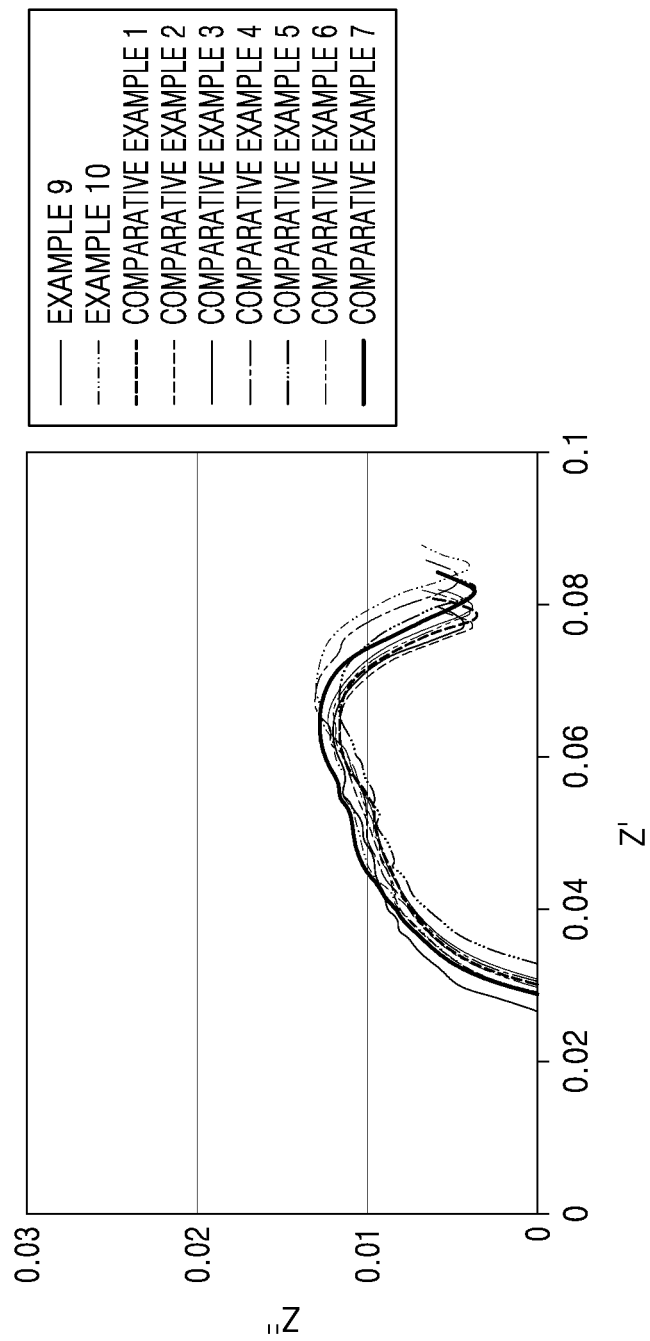
FIGS. 7A to 7C are graphs showing measurement of EIS after storing the lithium batteries manufactured in Examples 1 and 2 and Comparative Examples 1 to 7 at high temperature (60° C.) for 4 weeks.
Figure 7B:
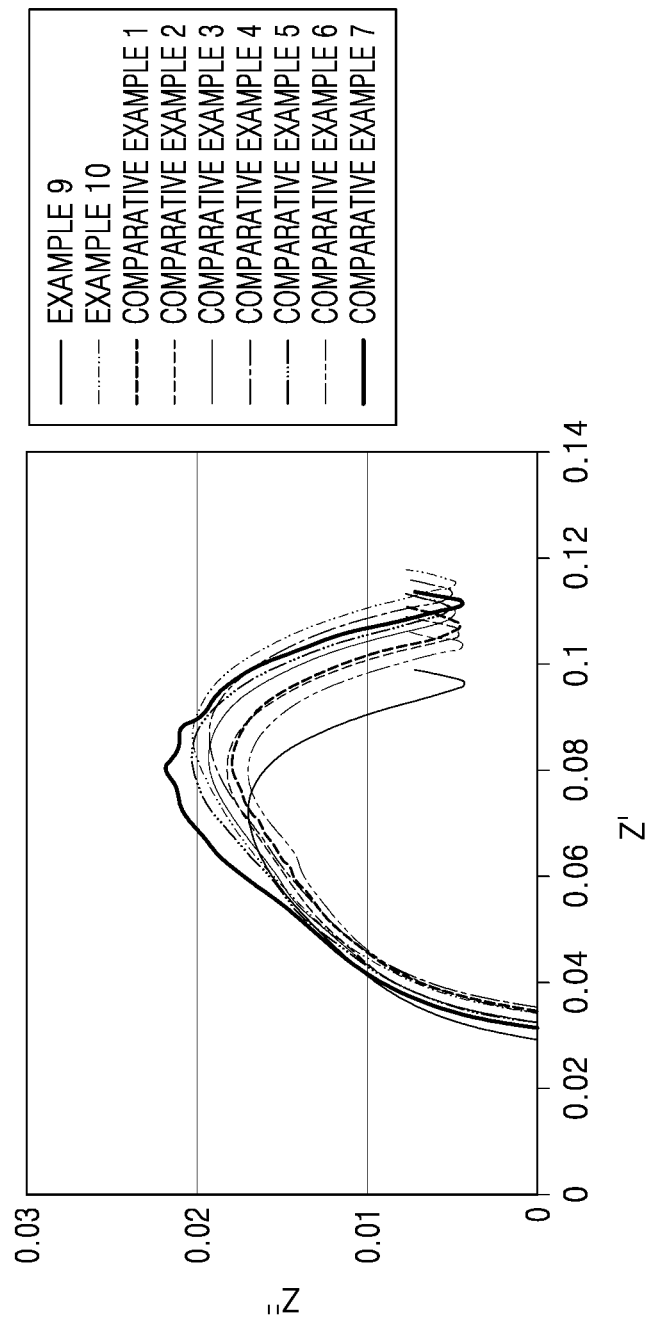
Figure 7C:
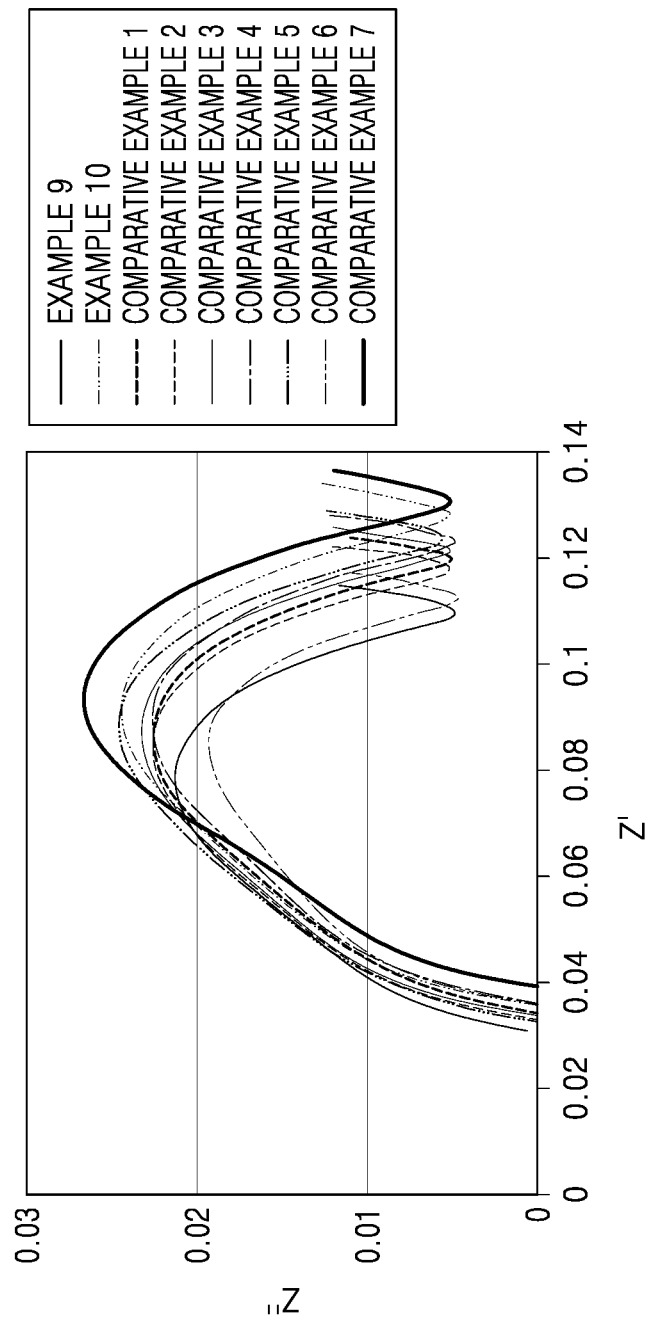

Results are shown in FIGS. 7A to 7C.

Referring to FIG. 7A, it is confirmed that Examples 1 and 2 had an initial Rct value (AR) similar to or greater than Comparative Examples 1 to 7, which indicates the cyclic nitrile-based compound was decomposed to form a film on a surface of the positive electrode. In addition, referring to FIGS. 7B and 7C, it is seen that, for the batteries taken out after being stored at high temperature for 4 weeks, Examples 1 and 2 had less change in the Rct value than Comparative Examples 1 to 7. That is, resistance after high temperature storage was less increasing in Examples 1 and 2 than in Comparative Examples 1 to 7, because the film present on the surface of the positive electrode suppressed deterioration of the active material.

TABLE 1

|  | DC-IR | High temperature storage characteristics [4.47 V @ day 28, 60° C.] | | | High temperature (45° C.) lifespan characteristics [4.47 V @300$^{th}$ cycle] | | | Room temperature (25° C.) lifespan characteristics [4.47 V @300$^{th}$ cycle] | | |
| --- | --- | --- | --- | --- | --- | --- | --- | --- | --- | --- |
|  | SOC 10% [mΩ] | Swelling [%] | Capacity Retention rate [%] | Capacity Recovery rate [%] | AC-IR [mΩ] | Capacity Retention rate [%] | Swelling [%] | AC-IR [mΩ] | Capacity Retention rate [%] | Swelling [%] |
| Example 1 | 65 | 4.9 | 75.2 | 88.3 | 36 | 89.1 | 7.5 | 34 | 93.0 | 5.9 |
| Example 2 | 65 | 4.8 | 75.4 | 88.3 | 36 | 89.1 | 7.6 | 36 | 93.9 | 6.2 |
| Comparative Example 1 | 57 | 6.2 | 75.0 | 88.3 | 35 | 87.5 | 7.0 | 30 | 94.2 | 6.1 |
| Comparative Example 2 | 56 | 5.8 | 75.5 | 88.7 | 36 | 86.3 | 7.3 | 29 | 89.7 | 5.3 |
| Comparative Example 3 | 59 | 5.8 | 74.9 | 88.4 | 37 | 84.9 | 7.6 | 31 | 88.8 | 5.3 |
| Comparative Example 4 | 65 | 5.2 | 75.4 | 88.8 | 40 | 73.9 | 7.7 | 37 | 87.7 | 5.3 |
| Comparative Example 5 | 61 | 4.7 | 75.3 | 87.4 | 36 | 85.4 | 7.5 | 30 | 90.2 | 5.7 |
| Comparative Example 6 | 59 | 6.2 | 74.6 | 87.8 | 49 | 84.0 | 7.7 | 33 | 90.8 | 6.3 |
| Comparative Example 7 | 62 | 6.2 | 75.5 | 87.8 | 36 | 86.4 | 7.3 | 32 | 91.8 | 6.4 |

The embodiments disclosed in the inventive concept are not intended to limit the technical spirit of the inventive concept, but to aid in understanding, and the scope of the present invention is defined by the appending claims, and all technical spirit of the equivalents of the present invention should be construed as included in the scope of the present invention.

The invention claimed is:

1. An organic electrolyte comprising at least one cyclic nitrile-based compound represented by Formula 1 below; and chain type nitrile-based compounds:

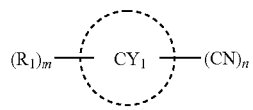

<Formula 1> wherein in Formula 1 above, $CY_1$ is a $C_5$-$C_{20}$ carbocyclic group, $R_1$ is selected from hydrogen, deuterium, —F, —Cl, —Br, —I, a hydroxyl group, a nitro group, an amino group, an amidino group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, and a substituted or unsubstituted $C_3$-$C_{10}$ cycloalkyl group, m is an integer selected from 0 to 39, and when m is 2 or more, 2 or more $R_1$ are the same as or different from each other, n is an integer selected from 1 to 40, and when $CY_1$ is a $C_6$ carbocyclic group, n is an integer selected from 1, 3, and 4; and 6≤m+n≤40 wherein the chain type nitrile-based compounds comprise a chain type nitrile-based compound containing two cyano groups, and a chain type nitrile-based compound containing three cyano groups.

2. The organic electrolyte of claim 1, wherein in Formula 1 above, $CY_1$ is selected from a cyclopentane group, a cyclohexane group, a cycloheptane group, a cyclooctane group, a cyclononane group, a cyclodecane group, a cycloundecane group, a cyclododecane group, a cyclotridecane group, a cyclotetradecane group, a cyclopentadecane group, a cyclohexadecane group, a cycloheptadecane group, a cyclooctadecane group, a cyclononadecane group, and a cycloicosane group.

3. The organic electrolyte of claim 1, wherein $R_1$ is selected from:

hydrogen, deuterium, —F, —Cl, —Br, —I, a hydroxyl group, a nitro group, an amino group, an amidino group, a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-pentyl group, a 3-pentyl group, and a sec-isopentyl group; and a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-a pentyl group, a 3-pentyl group, and a sec-isopentyl group, each substituted with at least one of deuterium, —F, —Cl, —Br, —I, a hydroxyl group, a nitro group, an amino group, and an amidino group.

4. The organic electrolyte of claim 1, wherein Formula 1 above is represented by any one selected from Formulas 1-1 to 1-8 and 1-12 to 1-36,
1-1
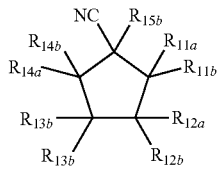
1-2
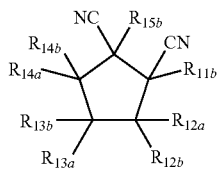
1-3
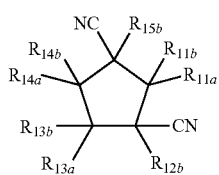
1-4
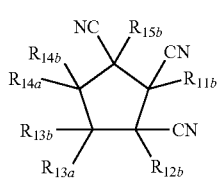
1-5
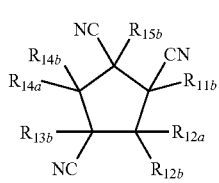
1-6
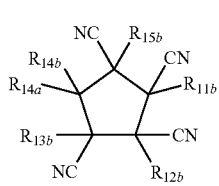
1-7
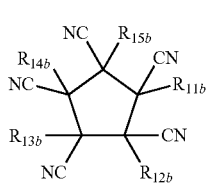
1-8
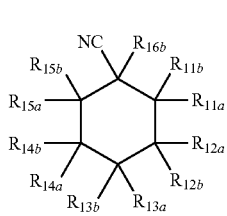
-continued
1-12
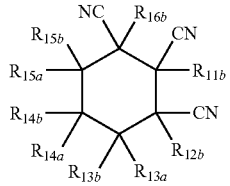
1-13
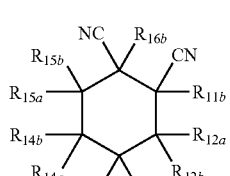
1-14
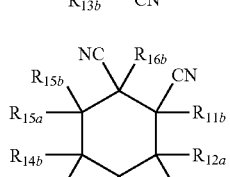
1-15
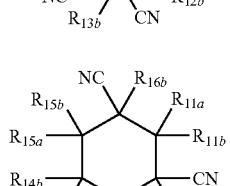
1-16
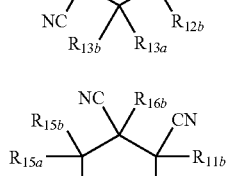
1-17
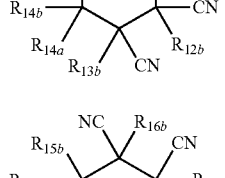
1-18
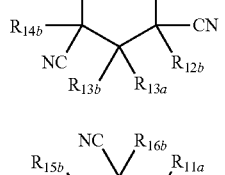
1-19
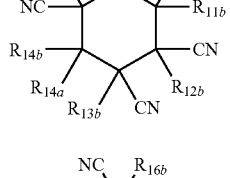

1-20 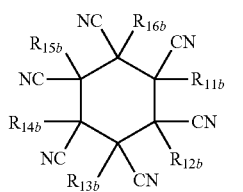
1-21 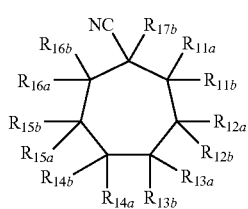
1-22 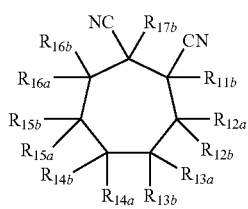
1-23 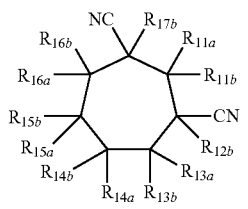
1-24 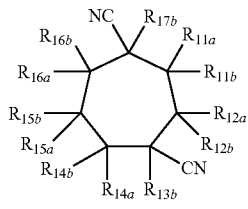
1-25 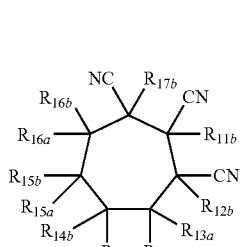
1-26 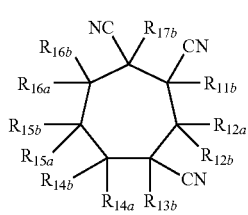
1-27 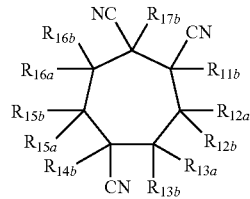
1-28 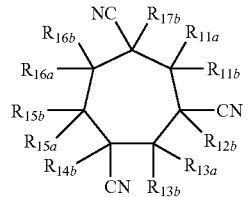
1-29 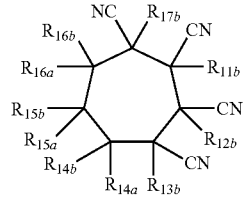
1-30 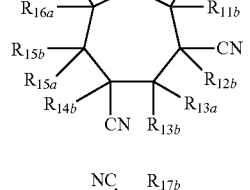
1-31 
1-32 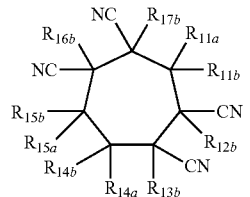
1-33 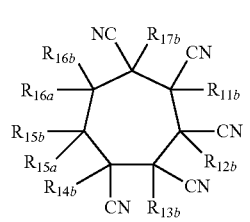

-continued

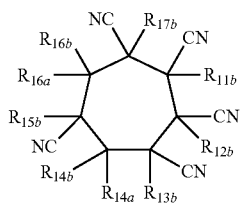

1-34

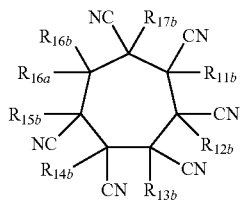

1-35

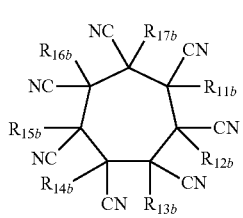

1-36 wherein in Formulas 1-1 to 1-8 and 1-12 to 1-36 above, $R_{11a}$ to $R_{17a}$, and $R_{11b}$ to $R_{17b}$ respectively refer to the description of $R_1$ in claim 1.

5. The organic electrolyte of claim 4, wherein
in Formulas 1-1 to 1-8 and 1-12 to 1-36 above,
$R_{11a}$ to $R_{17a}$, and $R_{11b}$ to $R_{17b}$ are each independently selected from:
hydrogen, deuterium, —F, —Cl, —Br, —I, a hydroxyl group, a nitro group, an amino group, an amidino group, a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-pentyl group, a 3-pentyl group, and a sec-isopentyl group; and
a methyl group, an ethyl group, a propyl group, an iso-propyl group, an n-butyl group, an iso-butyl group, a sec-butyl group, a tert-butyl group, a pentyl group, an iso-pentyl group, a neo-pentyl group, a tert-pentyl group, a sec-a pentyl group, a 3-pentyl group, and a sec-isopentyl group, each substituted with at least one of deuterium, —F, —Cl, —Br, —I, a hydroxyl group, a nitro group, an amino group, and an amidino group.

6. The organic electrolyte of claim 4, wherein
in Formulas 1-1 to 1-8 and 1-12 to 1-36 above,
$R_{11a}$ to $R_{17a}$, and $R_{11b}$ to $R_{17b}$ each are hydrogen.

7. The organic electrolyte of claim 1, wherein
the chain type nitrile-based compounds further comprise a chain type nitrile-based compound represented by Formula 2 below:

$$X_1—R—X_2 \qquad \text{<Formula 2>}$$

wherein in Formula 2 above,
R is selected from a substituted or unsubstituted $C_1$-$C_{20}$ alkylene group,
$X_1$ and $X_2$ are each independently selected from hydrogen, deuterium, —F, —Cl, —Br, —I, a hydroxyl group, a cyano group, a nitro group, an amidino group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, and a substituted or unsubstituted $C_3$-$C_{10}$ cycloalkyl group, and
at least one of $X_1$ and $X_2$ is a cyano group.

8. The organic electrolyte of claim 7, wherein
in Formula 2 above, R is selected from Formulas 2-1 to 2-5 below:

2-1

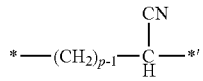

2-2

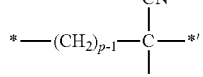

2-3

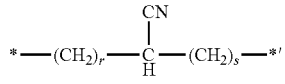

2-4

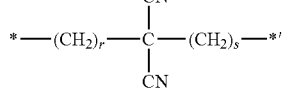

2-5 wherein in Formulas 2-1 to 2-5 above,
p is an integer selected from 1 to 20,
r and s are each independently an integer selected from 1 to 10,
$2 \leq r+s \leq 19$, and
\* and \*' are binding sites with $X_1$ and $X_2$, respectively in Formula 2.

9. The organic electrolyte of claim 7, wherein
both $X_1$ and $X_2$ are cyano groups.

10. The organic electrolyte of claim 1, wherein
the chain type nitrile-based compound containing two cyano groups comprises at least one compound selected from malononitrile, succinonitrile, glutaronitrile, adiponitrile, pimelonitrile, suberonitrile, azelanitrile, sebaconitrile, and undecane dinitrile.

11. The organic electrolyte of claim 1, wherein
the chain type nitrile-based compound containing three cyano groups comprises at least one compound selected from 1,2,3-hexanetricarbonitrile, 1,2,4-hexanetricarbonitrile, 1,2,5-hexanetricarbonitrile, 1,2,6-hexanetricarbonitrile, 1,3,4-hexanetricarbonitrile, 1,3,5-hexanetricarbonitrile, 1,3,6-hexanetricarbonitrile, and 1,4,5-hexanetricarbonitrile.

12. The organic electrolyte of claim 1, wherein
the chain type nitrile-based compound is contained in an amount of 3 wt % to 7 wt % with respect to a total weight of the organic electrolyte.

13. The organic electrolyte of claim 1, wherein
the cyclic nitrile-based compound and the chain type nitrile-based compound have a weight ratio of 1:5 to 2:5.

14. A secondary battery comprising:
a positive electrode;
a negative electrode; and
an organic electrolyte according to claim 1.

15. The secondary battery of claim 14, wherein after 300 cycles of charging/discharging at 45° C., capacity retention rate is 88% or greater.

16. The secondary battery of claim 14, wherein the secondary battery is a lithium ion polymer battery.

* * * * *

UNITED STATES PATENT AND TRADEMARK OFFICE
CERTIFICATE OF CORRECTION

PATENT NO. : 12,176,484 B2  
APPLICATION NO. : 17/310363  
DATED : December 24, 2024  
INVENTOR(S) : Aehui Goh et al.

Page 1 of 1

It is certified that error appears in the above-identified patent and that said Letters Patent is hereby corrected as shown below:

In the Claims

In Column 26, Lines 19-26, in Claim 4, Formula 1-14:

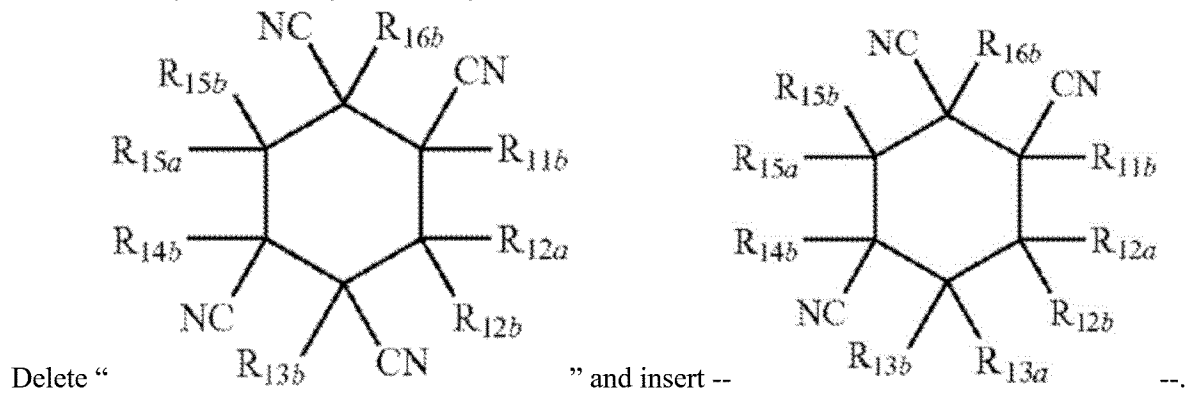

Signed and Sealed this  
Fifteenth Day of April, 2025

Coke Morgan Stewart  
*Acting Director of the United States Patent and Trademark Office*